United States Patent
Iwanaga et al.

(10) Patent No.: US 12,319,769 B2
(45) Date of Patent: *Jun. 3, 2025

(54) RAFT POLYMERIZATION REACTION SOLUTION AND RAFT POLYMERIZATION REACTION SOLUTION PRODUCTION METHOD

(71) Applicant: Techno-UMG Co., Ltd., Tokyo (JP)

(72) Inventors: Takashi Iwanaga, Tokyo (JP); Yoshitaka Naito, Tokyo (JP)

(73) Assignee: Techno-UMG Co., Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/695,973

(22) PCT Filed: Mar. 24, 2023

(86) PCT No.: PCT/JP2023/011722
§ 371 (c)(1),
(2) Date: Mar. 27, 2024

(87) PCT Pub. No.: WO2023/190111
PCT Pub. Date: Oct. 5, 2023

(65) Prior Publication Data
US 2024/0336709 A1  Oct. 10, 2024

(30) Foreign Application Priority Data

Mar. 29, 2022 (JP) ................ 2022-053655
Mar. 29, 2022 (JP) ................ 2022-053659

(51) Int. Cl.
| | | |
|---|---|---|
| C08F 293/00 | (2006.01) | |
| C08F 2/10 | (2006.01) | |
| C08F 2/38 | (2006.01) | |
| C08F 20/18 | (2006.01) | |

(52) U.S. Cl.
CPC ............ *C08F 293/005* (2013.01); *C08F 2/10* (2013.01); *C08F 2/38* (2013.01); *C08F 20/18* (2013.01); *C08F 2438/03* (2013.01)

(58) Field of Classification Search
None
See application file for complete search history.

(56) References Cited

U.S. PATENT DOCUMENTS

2010/0227975 A1* 9/2010 Such ............... C07C 329/00
558/243

FOREIGN PATENT DOCUMENTS

| JP | 2005-513252 | 5/2005 |
| JP | 4405807 | 1/2010 |
| WO | 03/055919 | 7/2003 |
| WO | 2020/198789 | 10/2020 |

OTHER PUBLICATIONS

International Search Report issued Jun. 13, 2023 in International (PCT) Application No. PCT/JP2023/011722.
Decision to Grant a Patent issued Nov. 28, 2023 in Japanese Application No. 2022-053655, with English translation.
Decision to Grant a Patent issued Nov. 28, 2023 in Japanese Application No. 2022-053659, with English translation.
Notice of Reasons for Refusal issued Oct. 17, 2023 in Japanese Application No. 2022-053655, with English translation.
Notice of Reasons for Refusal issued Oct. 17, 2023 in Japanese Application No. 2022-053659, with English translation.
Non-Final Office Action issued Jul. 2, 2024 in U.S. Appl. No. 18/639,582.
Final Office Action issued Oct. 16, 2024 in U.S. Appl. No. 18/639,582.

* cited by examiner

*Primary Examiner* — Richard A. Huhn
(74) *Attorney, Agent, or Firm* — Wenderoth, Lind & Ponack, L.L.P.

(57) ABSTRACT

What is provided is a RAFT polymerization reaction solution containing a RAFT agent represented by a specific chemical formula, water, and a water-soluble inorganic base, in which the RAFT polymerization reaction solution may further contain a polymerization initiator as an optional component, the RAFT agent has an acid group, the acid group forms a salt, and a molar ratio represented by $M3/(M1+M2)$ is 1.0 to 10, in which the number of moles of the acid group forming the salt is indicated as $M1$, the number of moles of an acid group of the polymerization initiator, which may form a salt, is indicated as $M2$, and the number of moles of the water-soluble inorganic base is indicated as $M3$.

6 Claims, No Drawings

RAFT POLYMERIZATION REACTION SOLUTION AND RAFT POLYMERIZATION REACTION SOLUTION PRODUCTION METHOD

TECHNICAL FIELD

The present invention relates to a RAFT polymerization reaction solution and a RAFT polymerization reaction solution production method. Priority is claimed on Japanese Patent Application No. 2022-053655 filed on Mar. 29, 2022 and Japanese Patent Application No. 2022-053659 filed on Mar. 29, 2022, the contents of which are incorporated herein.

BACKGROUND ART

In the related art, Reversible Addition-Fragmentation Chain Transfer (RAFT) polymerization has been known. According to the RAFT polymerization, not only a polymer having a narrow molecular weight distribution can be formed, but also a block copolymer having a plurality of blocks can be easily formed. Various RAFT agents essential for such RAFT polymerization have been proposed (for example, Patent Document 1).

CITATION LIST

Patent Document

[Patent Document 1]
Japanese Patent No. 4405807

SUMMARY OF INVENTION

Technical Problem

The RAFT polymerization is based on living radical polymerization. In other radical polymerizations, a terminal portion of the polymer formed by chain transfer or termination reaction is no longer polymerized, and the polymerization active species is dead. However, in the RAFT polymerization, the terminal portion of the polymer formed is not dead, and in a case where a monomer is added, the polymerization can be continued in the terminal portion of the polymer. Although the RAFT polymerization has an excellent reaction mechanism as described above, the RAFT agent, the monomer, and the polymerization initiator are required to be present in the same phase in the reaction system. A general reaction system for the RAFT polymerization is a reaction system of an emulsion in which a hydrophobic monomer is dispersed in a water phase in an oil droplet form, and it is important that the RAFT agent and the polymerization initiator are sufficiently mixed with the monomer. That is, in the aqueous RAFT polymerization, an emulsifier is often used in combination. However, this mixing is not necessarily efficient, and there is a problem that the reaction time is long or the amount of coagulated matter (reaction residue) is large.

In order to solve the above-described problems, the present invention focuses on the RAFT agent, and provides a RAFT polymerization reaction solution and a RAFT polymerization reaction solution production method, which are suitable for RAFT polymerization in an aqueous system.

Solution to Problem

[1-1] A RAFT polymerization reaction solution containing:
a RAFT agent represented by Formula (1) described later;
water; and
a water-soluble inorganic base,
in which the RAFT polymerization reaction solution may further contain a polymerization initiator as an optional component,
a molar ratio represented by M3/(M1+M2) is 1.0 to 10, in which the number of moles of an acid group included in the RAFT agent is indicated as M1, the number of moles of an acid group which may be included in the polymerization initiator is indicated as M2, and the number of moles of the water-soluble inorganic base is indicated as M3, and
at least a part of the acid group included in the RAFT agent and at least a part of the acid group which may be included in the polymerization initiator form a salt with a cation component of the water-soluble inorganic base.

[1-2] The RAFT polymerization reaction solution according to [1-1],
in which Z in Formula (1) is an alkylthio group which may be substituted.

[1-3] The RAFT polymerization reaction solution according to [1-1] or [1-2],
in which the polymerization initiator is a water-soluble polymerization initiator.

[1-4] A RAFT polymerization reaction solution containing:
a polymer-type RAFT agent represented by Formula (2) described later;
water; and
a water-soluble inorganic base,
in which at least a part of an acid group included in the polymer-type RAFT agent forms a salt with a cation component of the water-soluble inorganic base.

[1-5] The RAFT polymerization reaction solution according to [1-4],
in which $R^1$ is an organic group having a carbon atom bonded to X, and
the carbon atom of the organic group is tertiary.

[1-6] The RAFT polymerization reaction solution according to [1-4],
in which X to which $R^1$ is bonded is a methacrylic acid ester,
$R^1$ is an organic group having a carbon atom bonded to X, the carbon atom of the organic group is quaternary, and the carbon atom is bonded to a cyano group.

[1-7] A RAFT polymerization reaction solution containing:
a hydrophilic copolymer-type RAFT agent represented by Formula (3) described later;
water; and
a water-soluble inorganic base,
in which at least a part of an acid group included in the hydrophilic copolymer-type RAFT agent forms a salt with a cation component of the water-soluble inorganic base.

[1-8] The RAFT polymerization reaction solution according to any one of [1-1] to [1-7],
in which the RAFT agent is one or more selected from Formulae (1a) to (1n) described later.

[1-9] The RAFT polymerization reaction solution according to any one of [1-1] to [1-8], in which the polymerization initiator is one or more selected from inorganic peroxides such as potassium persulfate, sodium persulfate, and ammonium persulfate; organic peroxides such as benzoyl peroxide and isobutyryl peroxide; azo compounds such as azobisisobutyronitrile, 4-methoxy-azobisvaleronitrile, and 4,4'-azobis(4-cyanopentanoic acid); and redox-based initiators in which an organic peroxide is combined with ferrous sulfate, a chelating agent, and a reducing agent, for example, initiators consisting of cumene hydroperoxide, ferrous sulfate, sodium pyrophosphate, and dextrose, and initiators in which t-butyl hydroperoxide, sodium formaldehyde sulfoxylate (Rongalite), ferrous sulfate, and disodium ethylenediaminetetraacetate are combined.

[1-10] The RAFT polymerization reaction solution according to any one of [1-1] to [1-8], in which an ethylenically unsaturated monomer is further blended in the RAFT polymerization reaction solution, and the ethylenically unsaturated monomer is one or more selected from compounds represented by Formula (10) described later.

[2-1] A RAFT polymerization reaction solution production method including:

a step 1 of mixing a RAFT agent having an acid group, which is represented by Formula (1) described later, water, and a water-soluble inorganic base with each other to form a salt of at least a part of the acid group included in the RAFT agent and a cation derived from the water-soluble inorganic base and to obtain a RAFT agent aqueous solution in which the RAFT agent is dissolved in water; and a step 2 of adding a water-soluble polymerization initiator and an ethylenically unsaturated monomer to the RAFT agent aqueous solution and stirring the mixture to perform RAFT polymerization of the ethylenically unsaturated monomer dispersed in water and to obtain a RAFT polymerization reaction solution (A) in which a polymer-type RAFT agent represented by Formula (2) described later is dispersed in water.

[2-2] The RAFT polymerization reaction solution production method according to [2-1], in which a pH of the RAFT polymerization reaction solution (A) obtained in the step 2 is 8 to 13.

[2-3] The RAFT polymerization reaction solution production method according to [2-1] or [2-2], in which, in a reaction solution after adding the ethylenically unsaturated monomer and the water-soluble polymerization initiator to the RAFT agent aqueous solution and immediately before starting polymerization, a molar ratio represented by (M4+M5)/(M1+M2) is 1.0 to 10, in which the number of moles of an acid group included in the RAFT agent is indicated as M1, the number of moles of an acid group which may be included in the water-soluble polymerization initiator is indicated as M2, the number of moles of the water-soluble inorganic base added in the step 1 is indicated as M4, and the number of moles of a water-soluble inorganic base which may be added in the step 2 is indicated as M5.

[2-4] The RAFT polymerization reaction solution production method according to any one of [2-1] to [2-3], further including:

a step 3 of adding an ethylenically unsaturated monomer to the RAFT polymerization reaction solution (A) obtained in the step 2 and stirring the mixture to perform RAFT polymerization of the ethylenically unsaturated monomer dispersed in water and to obtain a RAFT polymerization reaction solution (B) in which a hydrophilic copolymer-type RAFT agent represented by Formula (3) described later is dispersed in water.

[2-5] The RAFT polymerization reaction solution production method according to [2-4], in which a pH of the RAFT polymerization reaction solution (B) obtained in the step 3 is 8 to 13.

[2-6] The RAFT polymerization reaction solution production method according to [2-4] or [2-5], in which a water-soluble polymerization initiator is added to the RAFT polymerization reaction solution (A) in the step 3.

[2-7] The RAFT polymerization reaction solution production method according to any one of [2-1] to [2-6], in which the RAFT agent is one or more selected from Formulae (1a) to (1n) described later.

[2-8] The RAFT polymerization reaction solution production method according to any one of [2-1] to [2-7], in which the polymerization initiator is one or more selected from inorganic peroxides such as potassium persulfate, sodium persulfate, and ammonium persulfate; organic peroxides such as benzoyl peroxide and isobutyryl peroxide; azo compounds such as azobisisobutyronitrile, 4-methoxy-azobisvaleronitrile, and 4,4'-azobis(4-cyanopentanoic acid); and redox-based initiators in which an organic peroxide is combined with ferrous sulfate, a chelating agent, and a reducing agent, for example, initiators consisting of cumene hydroperoxide, ferrous sulfate, sodium pyrophosphate, and dextrose, and initiators in which t-butyl hydroperoxide, sodium formaldehyde sulfoxylate (Rongalite), ferrous sulfate, and disodium ethylenediaminetetraacetate are combined.

[2-9] The RAFT polymerization reaction solution production method according to any one of [2-1] to [2-8], in which the ethylenically unsaturated monomer is one or more selected from compounds represented by Formula (10) described later.

Advantageous Effects of Invention

According to the RAFT polymerization reaction solution of the present invention, since the acid group included in the RAFT agent forms a salt, and the ratio represented by M3/(M1+M2), in which the number of moles of the acid group forming the salt is indicated as M1, the number of moles of the water-soluble inorganic base in the reaction solution is indicated as M3, and the number of moles of an acid group which may be included in the polymerization initiator is indicated as M2, is within a specific range, a favorable RAFT polymerization can be performed. In this case, each of the RAFT agent and the reaction product thereof can be sufficiently dispersed in an aqueous reaction solution without adding another emulsifier to the aqueous RAFT polymerization reaction solution.

According to the RAFT polymerization reaction solution production method of the present invention, it is possible to produce a RAFT polymerization reaction solution in which a polymer-type RAFT agent is dispersed in water, by the step 1 of forming the salt of the acid group included in the RAFT agent and the step 2 of reacting the RAFT agent forming the salt with an ethylenically unsaturated monomer to obtain the polymer-type RAFT agent. By adding the ethylenically unsaturated monomer to the produced aqueous RAFT polymerization reaction solution, a favorable RAFT polymerization can be performed. In this case, the polymer-type RAFT agent and the reaction product thereof can be sufficiently dispersed in an aqueous reaction solution without adding another emulsifier to the aqueous RAFT polymerization reaction solution.

DESCRIPTION OF EMBODIMENTS

The following definitions of terms apply throughout the present specification and claims.

A term "(meth)acrylate" means acrylate or methacrylate.

A notation of "C1 to C6" means "the number of carbon atoms of 1 to 6", and "C" in the notation represents an abbreviation of the number of carbon atoms.

The term "to" indicating a numerical value range means that numerical values described before and after the numerical value range are included as the lower limit value and the upper limit value.

<<First Aspect>>

A first aspect of the present invention is a RAFT polymerization reaction solution containing a RAFT agent represented by Formula (1), water, and a water-soluble inorganic base, in which the RAFT polymerization reaction solution may further contain a polymerization initiator as an optional component.

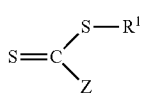

(1)

[in Formula (1), $R^1$ represents an organic group, the organic group has one or more acid groups selected from —$CO_2H$, —$SO_3H$, and —$PO_4H$, Z represents an organic group selected from an alkyl group, an aryl group, an arylalkyl group, an alkylthio group, an arylthio group, and an arylalkylthio group, and a part of the organic group represented by Z may be substituted]

At least a part of the acid group included in the above-described RAFT agent forms a salt. In a case where the above-described RAFT agent has one acid group in the molecule, the number of moles of the acid group of the above-described RAFT agent contained in the RAFT polymerization reaction solution according to the present aspect is the same as the number of moles of molecules of the RAFT agent. In a case where the number of acid groups in the molecule of the above-described RAFT agent is m, the number of moles of the acid group of the RAFT agent contained in the RAFT polymerization reaction solution according to the present aspect is represented by the number of moles of molecules of the RAFT agent×m.

The polymerization initiator which is an optional component may or may not have an acid group. In a case where the polymerization initiator has an acid group, at least a part of the acid group may form a salt or may not form a salt, but from the viewpoint of sufficiently obtaining the effects of the present invention, it is preferable that the salt is formed. As the type of the acid group included in the polymerization initiator, the same acid groups as those described for the acid group of the above-described RAFT agent are exemplary examples. In a case where the number of acid groups in the molecule of the polymerization initiator is n, the number of moles of the acid group of the polymerization initiator contained in the RAFT polymerization reaction solution according to the present aspect is represented by the number of moles of molecules of the polymerization initiator×n.

In the RAFT polymerization reaction solution according to the first aspect, in a case where the number of moles of the acid group included in the above-described RAFT agent is indicated as M1, the number of moles of the acid group which may be included in the polymerization initiator is indicated as M2, and the number of moles of the water-soluble inorganic base is indicated as M3, a molar ratio represented by M3/(M1+M2) is 1.0 to 10, preferably 1.5 to 7.0, more preferably 2.0 to 5.0, still more preferably 2.5 to 4.5, and particularly preferably 3.0 to 4.0.

In a case of being equal to or more than the lower limit value of the above-described range, a reaction time of the RAFT polymerization can be shortened, a yield of a target product can be increased, the amount of coagulated matter can be reduced, and the molecular weight distribution of the target product can be narrowed.

In a case of being equal to or less than the upper limit value of the above-described range, it is possible to suppress a pH of the RAFT polymerization reaction solution according to the present aspect from being too high and to reduce the volume-average particle diameter (MV) of the target product.

The above-described RAFT agent contained in the RAFT polymerization reaction solution according to the first aspect may be one kind or two or more kinds. The above-described number of moles M1 is the total number of moles of acid groups of all RAFT agents.

The above-described polymerization initiator contained in the RAFT polymerization reaction solution according to the first aspect may be one kind or two or more kinds. The above-described number of moles M2 is the total number of moles of acid groups of all polymerization initiators.

The above-described water-soluble inorganic base contained in the RAFT polymerization reaction solution according to the first aspect may be one kind or two or more kinds. The above-described number of moles M3 is the total number of moles of all inorganic bases.

The acid group included in the above-described RAFT agent is preferably one or more selected from —$CO_2H$, —$SO_3H$, and —$PO_4H$, and from the viewpoint that it is easy to form a salt and adjust the pH of the reaction solution, more preferably —$CO_2H$.

In a case where each of the acid group of the above-described RAFT agent and the acid group of the above-described polymerization initiator forms a salt, the salt is formed by an anion of the acid group and a counter cation. The counter cation is not particularly limited, and cations of alkali metals such as sodium and potassium, cations of alkaline earth metals such as magnesium and calcium, and the like are exemplary examples. The counter cation is preferably derived from the above-described water-soluble inorganic base.

As the above-described water-soluble inorganic base, for example, a hydroxide having a hydroxide ion as an anion is preferable. Specifically, from the viewpoint of enhancing a surfactant effect of the salt-formed RAFT agent, sodium hydroxide or potassium hydroxide is preferable.

The water-soluble inorganic base is an inorganic base which is dissolved in 100 g of water at 20° C. in an amount of 1 g or more.

The organic group represented by $R^1$ is not particularly limited as long as the organic group has the above-described acid group, and any organic group can be adopted. For example, an organic group having a linear or branched monovalent alkyl group of C1 to C10 as a basic skeleton, in which any one or more hydrogen atoms of the alkyl group is substituted with the above-described acid group, is an exemplary example. Any one or more methylene groups constituting the above-described alkyl group may be substituted with —O—, —C(=O)O—, —OC(=O)—, or —C(=O)NH— (provided that a case where oxygen atoms are bonded to each other is excluded).

Any one or more hydrogen atoms of the above-described alkyl group may be substituted with —CN.

Specifically, as $R^1$, for example, —CH$_2$CO$_2$H, —CH$_2$CH$_2$CO$_2$H, —CH(CH$_3$)CO$_2$H, —CH(CO$_2$H)CH$_2$CO$_2$H, —C(CH$_3$)(CH$_3$)CO$_2$H, —C(CN)(CH$_3$)CH$_2$CH$_2$CO$_2$H, and —CH(CH$_3$)CONR$^a$R$^b$ are exemplary examples.

$R^a$ and $R^b$ are each independently H, a C1 to C6 alkyl group, a C1 to C6 alkoxy group, a C6 to C12 aryl group, a C7 to C18 alkylaryl group, or a C6 to C12 heteroaryl group. However, at least one hydrogen atom included in $R^a$ and $R^b$ is substituted with an acid group selected from —CO$_2$H, —SO$_3$H, or —PO$_4$H, and the acid group forms a salt. $R^a$ and $R^b$ may be the same or different from each other.

In the present specification, a term "aryl group" refers to a group derived from an aromatic hydrocarbon, that is, a functional group or a substituent including an aromatic ring. The term "heteroaryl group" refers to a group in which one or more carbon atoms in the aryl group are substituted with an atom other than a carbon atom (for example, a nitrogen atom, an oxygen atom, or a sulfur atom). A ring constituting the aryl group may be a monocyclic ring or a polycyclic ring. Each ring is preferably a 5-membered ring or a 6-membered ring. Specifically, as the ring, for example, benzene, biphenyl, terphenyl, quaterphenyl, naphthalene, tetrahydronaphthalene, 1-benzylnaphthalene, anthracene, dihydroanthracene, benzanthracene, dibenzanthracene, phenanthracene, perylene, pyridine, 4-phenylpyridine, 3-phenylpyridine, thiophene, benzothiophene, naphthothiophene, thianthrene, furan, benzofuran, pyrene, isobenzofuran, chromene, xanthene, phenoxazine, pyrrole, imidazole, pyrazole, pyrazine, pyrimidine, pyridazine, indole, indolizine, isoindole, purine, quinoline, isoquinoline, phthalazine, quinoxaline, quinazoline, pteridine, carbazole, carboline, phenanthridine, acridine, phenanthroline, phenazine, isothiazole, isoxazole, phenoxazine, and the like are exemplary examples.

In the present specification, a term "arylalkyl group" means an aromatic alkyl group, and a group in which a hydrogen atom at a terminal of a linear alkyl group (for example, C1 to C6) is substituted with an aryl group is an exemplary example. Specifically, for example, benzyl, phenethyl, diphenylmethyl, triphenylmethyl, 1-naphthylmethyl, 2-naphthylmethyl, 2,2-diphenylethyl, 3-phenylpropyl, 4-phenylbutyl, 5-phenylpentyl, and the like are exemplary examples.

The organic group represented by Z is an organic group selected from an alkyl group, an aryl group, an arylalkyl group, an alkylthio group, an arylthio group, or an arylalkylthio group.

As the above-described alkyl group, for example, linear, branched, or cyclic alkyl groups of C1 to C20, and alkyl groups in which these alkyl groups are randomly combined are exemplary examples. In Formula (1), in a case where Z is a cyclic alkyl group or a group including a cyclic alkyl group, any one or more carbon atoms constituting the cyclic alkyl group may be substituted with a nitrogen atom, an oxygen atom, or a sulfur atom (provided that a case where oxygen atoms are bonded to each other is excluded). Among the carbon atoms of the cyclic alkyl group, a carbon atom bonded to a thio-ketone group (>C=S) of Formula (1) may be substituted with the above-described heteroatom. Any one or more methylene groups (—CH$_2$—) constituting the cyclic alkyl group may be substituted with a ketone group (>C=O). The above-described cyclic alkyl group is preferably a 5- to 8-membered ring and more preferably a 5- or 6-membered ring.

The above-described alkylthio group is a group in which the above-described alkyl group is bonded to a sulfide group (—S—).

The above-described arylthio group is a group in which an aryl group is bonded to the sulfide group.

The above-described arylalkylthio group is a group in which an arylalkyl group is bonded to the sulfide group.

From the viewpoint of the surfactant effect of the salt-formed RAFT agent in an aqueous system, Z in Formula (1) is preferably the alkylthio group.

A part of the above-described organic group represented by Z in Formula (1) may be substituted with any group or may not be substituted. In the present specification, the phrase "may be substituted" and the phrase "substituted with any group" mean that a part of the organic group (for example, a hydrogen atom, a methylene group, a methyl group, or the like) is substituted with one or more groups selected from alkyl, alkenyl, alkynyl, aryl, halo, haloalkyl, haloalkenyl, haloalkynyl, haloaryl, hydroxy, alkoxy, alkenyloxy, aryloxy, benzyloxy, haloalkoxy, haloalkenyloxy, acetyleno, carboximidyl, haloaryloxy, isocyano, cyano, formyl, carboxyl, nitro, nitroalkyl, nitroalkenyl, nitroalkynyl, nitroaryl, alkylamino, dialkylamino, alkenylamino, alkynylamino, arylamino, diarylamino, benzylamino, imino, alkylimino, alkenylimino, alkynylimino, arylimino, benzylimino, dibenzylamino, acyl, alkenylacyl, alkynylacyl, arylacyl, acylamino, diacylamino, acyloxy, alkylsulfonyloxy, arylsulfonyloxy, heterocyclyl, heterocycloxy, heterocyclamino, haloheterocyclyl, alkylsulfonyl, arylsulfonyl, alkylsulfinyl, arylsulfinyl, carboalkoxy, alkylthio, benzylthio, acylthio, sulfonamide, sulfanyl, a sulfo and phosphorus-containing group, alkoxysilyl, silyl, alkylsilyl, alkylalkoxysilyl, phenoxysilyl, alkylphenoxysilyl, alkoxyphenoxysilyl, aryloxyphenoxysilyl, allophanyl, guanidino, hydantoyl, ureido, or ureylene.

In the present specification, the terms "halogen" and "halo" refer to iodine, bromine, chlorine, and fluorine unless otherwise specified.

In the above definition, the term "alkyl" used alone or in a combination such as "alkenyloxyalkyl", "alkylthio", "alkylamino", and "dialkylamino" refers to a linear, branched, or cyclic alkyl, preferably C1 to C20 alkyl or cycloalkyl. As the linear and branched alkyl, methyl, ethyl, propyl, isopropyl, butyl, isobutyl, sec-butyl, tert-butyl, amyl, isoamyl, sec-amyl, 1,2-dimethylpropyl, 1,1-dimethylpropyl, hexyl, 4-methylpentyl, 1-methylpentyl, 2-methylpentyl, 3-methylpentyl, 1,1-dimethylbutyl, 2,2-dimethylbutyl, 3,3-dimethylbutyl, 1,2-dimethylbutyl, 1,3-dimethylbutyl, 1,2,2-trimethylpropyl, 1,1,2-trimethylpropyl, heptyl, 5-methoxyhexyl, 1-methylhexyl, 2,2-dimethylpentyl, 3,3-dimethylpentyl, 4,4-dimethylpentyl, 1,2-dimethylpentyl, 1,3-dimethylpentyl, 1,4-dimethylpentyl, 1,2,3-trimethylbutyl, 1,1,2-trimethylbutyl, 1,1,3-trimethylbutyl, octyl, 6-methylheptyl, 1-methylheptyl, 1,1,3,3-tetramethylbutyl, nonyl, 1-, 2-, 3-, 4-, 5-, 6-, or 7-methyloctyl, 1-, 2-, 3-, 4-, or 5-ethylheptyl, 1-, 2-, or 3-propylhexyl, decyl, 1-, 2-, 3-, 4-, 5-, 6-, 7-, or 8-methylnonyl, 1-, 2-, 3-, 4-, 5-, or 6-ethyloctyl, 1-, 2-, 3-, or 4-propylheptyl, undecyl, 1-, 2-, 3-, 4-, 5-, 6-, 7-, 8-, or 9-methyldecyl, 1-, 2-, 3-, 4-, 5-, 6-, or 7-ethylnonyl, 1-, 2-, 3-, 4-, or 5-propyloctyl, 1-, 2-, or 3-butylheptyl, 1-pentylhexyl, dodecyl, 1-, 2-, 3-, 4-, 5-, 6-, 7-, 8-, 9-, or 10-methylundecyl, 1-, 2-, 3-, 4-, 5-, 6-, 7-, or 8-ethyldesyl, 1-, 2-, 3-, 4-, 5-, or 6-propylnonyl, 1-, 2-, 3-, or 4-butyloctyl, and 1-2-pentylheptyl are exemplary examples. As the cyclic alkyl, monocyclic or polycyclic alkyl groups such as cyclopropyl, cyclobutyl, cyclopentyl, cyclohexyl, cycloheptyl, cyclooctyl, cyclononyl, and cyclodecyl are exemplary examples.

The term "alkoxy" refers to a linear or branched alkoxy, preferably C1 to C20 alkoxy. As the alkoxy, methoxy, ethoxy, n-propoxy, isopropoxy, and various butoxy isomers are exemplary examples.

The term "alkenyl" refers to a group which is formed from a linear, branched, or cyclic alkene including a mono-, di-, or polyethylenically unsaturated alkyl or cycloalkyl group as defined above, preferably C2 to C20 alkenyl. As the alkenyl, vinyl, allyl, 1-methylvinyl, butenyl, isobutenyl, 3-methyl-2-butenyl, 1-pentenyl, cyclopentenyl, 1-methyl-cyclopentenyl, 1-hexenyl, 3-hexenyl, cyclohexenyl, 1-heptenyl, 3-heptenyl, 1-octenyl, cyclooctenyl, 1-nonenyl, 2-nonenyl, 3-nonenyl, 1-decenyl, 3-decenyl, 1,3-butadienyl, 1,4-pentadienyl, 1,3-cyclopentadienyl, 1,3-hexadienyl, 1,4-hexadienyl, 1,3-cyclohexadienyl, 1,4-cyclohexadienyl, 1,3-cycloheptadienyl, 1,3,5-cycloheptatrienyl, and 1,3,5,7-cyclooctatetraenyl are exemplary examples.

The term "alkynyl" refers to a group which is formed from a linear, branched, or cyclic alkyne including a group structurally same as the alkyl or cycloalkyl group as defined above, preferably C2 to C20 alkynyl. As the alkynyl, ethynyl, 2-propynyl, 2- or 3-butynyl, and the like are exemplary examples.

The term "acyl" in a complex term such as "acyloxy", "acylthio", "acylamino", and "diacylamino" or used alone refers to a carbamoyl group, an aliphatic acyl group, an acyl group containing an aromatic ring, (referred to as aromatic acyl), or an acyl group containing a heterocyclic ring (referred to as heterocyclic acyl), preferably C1 to C20 acyl. As the acyl, carbamoyl; linear or branched alkanoyl such as formyl, acetyl, propanoyl, butanoyl, 2-methylpropanoyl, pentanoyl, 2,2-dimethylpropanoyl, hexanoyl, heptanoyl, octanoyl, nonanoyl, decanoyl, undecanoyl, dodecanoyl, tridecanoyl, tetradecanoyl, pentadecanoyl, hexadecanoyl, heptadecanoyl, octadecanoyl, nonadecanoyl, and eicosanoyl; alkoxycarbonyl such as methoxycarbonyl, ethoxycarbonyl, t-butoxycarbonyl, t-pentyloxycarbonyl, and heptyloxycarbonyl; cycloalkylcarbonyl such as cyclopropylcarbonyl, cyclobutylcarbonyl, cyclopentylcarbonyl, and cyclohexylcarbonyl; alkylsulfonyl such as methylsulfonyl and ethylsulfonyl; alkoxysulfonyl such as methoxysulfonyl and ethoxysulfonyl; aroyl such as benzoyl, toluoyl, and naphthoyl; aralkanoyl such as phenylalkanoyl (for example, phenylacetyl, phenylpropanoyl, phenylbutanoyl, phenylisobutyryl, phenylpentanoyl, and phenylhexanoyl) and naphthylalkanoyl (for example, naphthylacetyl, naphthylpropanoyl, and naphthylbutanoyl); aralkenoyl such as phenylalkenoyl (for example, phenylpropenoyl, phenylbutenoyl, phenylmethacryloyl, phenylpentenoyl, and phenylhexenoyl) and naphthylalkenoyl (for example, naphthylpropenoyl, naphthylbutenoyl, and naphthylpentenoyl); aralkoxycarbonyl such as phenylalkoxycarbonyl (for example, benzyloxycarbonyl); aryloxycarbonyl such as phenoxycarbonyl and naphthyloxycarbonyl; aryloxyalkanoyl such as phenoxyacetyl and phenoxypropionyl; arylcarbamoyl such as phenylcarbamoyl; arylthiocarbamoyl such as phenylthiocarbamoyl; arylglyoxyloyl such as phenylglyoxyl and naphthylglyoxyl; arylsulfonyl such as phenylsulfonyl and naphthylsulfonyl; heterocyclic carbonyl; heterocyclic alkanoyl such as thienylacetyl, thienylpropanoyl, thienylbutanoyl, thienylpentanoyl, thienylhexanoyl, thiazolylacetyl, thiadiazolylacetyl, and tetrazolylacetyl; heterocyclic alkenoyl such as heterocyclic propenoyl, heterocyclic butenoyl, heterocyclic pentenoyl, and heterocyclic hexenoyl; and heterocyclic glyoxyloyl such as thiazolylglyoxyl and thienylglyoxyl are exemplary examples.

As the above-described RAFT agent contained in the RAFT polymerization reaction solution according to the first aspect, a known RAFT agent can be adopted. However, since an acid group of the known RAFT agent does not form a salt, it is preferable to react the RAFT agent with a water-soluble inorganic base to form a salt of the acid group of the RAFT agent.

In the present specification, the terms "heterocyclic", "heterocyclyl", and "heterocycl" used alone or as a part of the terms, such as "heterocyclic alkenoyl", "heterocycloxy", and "haloheterocyclyl", refer to an aromatic, pseudoaromatic, or non-aromatic ring or a ring system, which contains one or more heteroatoms selected from a nitrogen atom, an oxygen atom, and a sulfur atom, and which may be optionally substituted. The ring or the ring system preferably has 3 to 20 carbon atoms. The ring or the ring system may be selected from those described above in relation to the definition of "heteroaryl".

As preferred examples of the RAFT agent represented by Formula (1), the following compounds are exemplary examples.

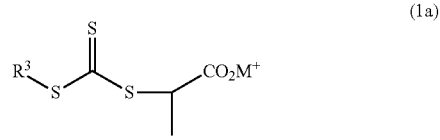

(1a)

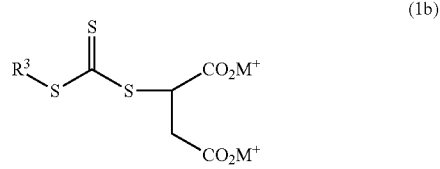

(1b)

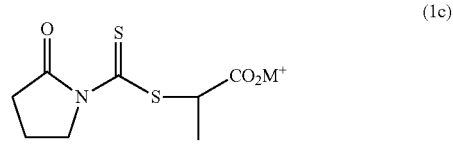

(1c)

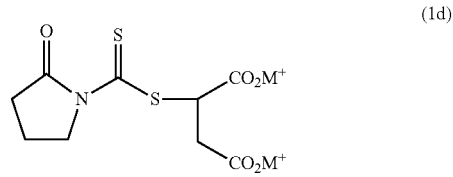

(1d)

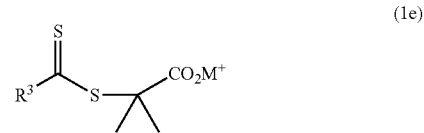

(1e)

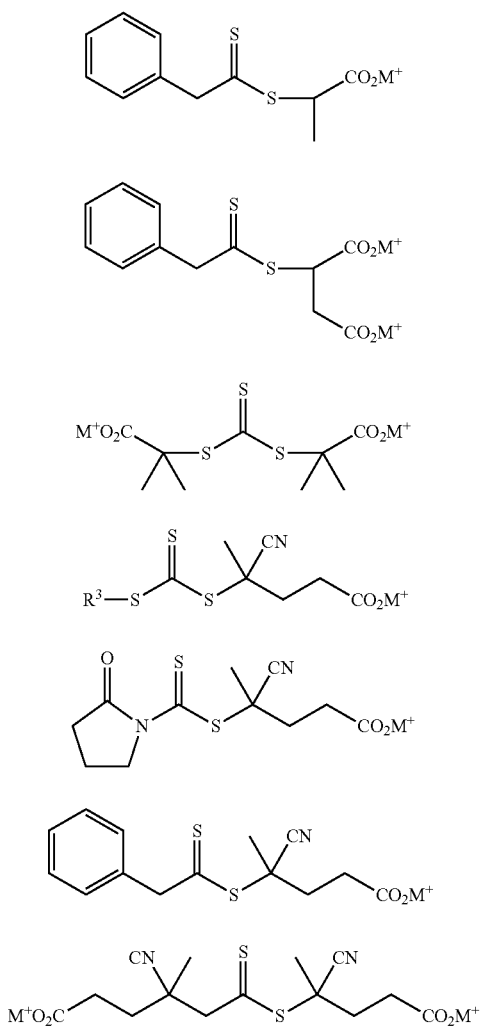

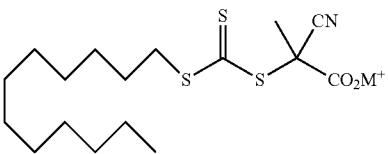

As the polymerization initiator which is an optional component of the RAFT polymerization reaction solution according to the first aspect, a known radical polymerization initiator can be adopted. For example, an azo polymerization initiator, a photopolymerization initiator, an inorganic peroxide, an organic peroxide, and a redox-based initiator obtained by combining an organic peroxide, a transition metal, and a reducing agent are exemplary examples. Among these, an azo polymerization initiator, an inorganic peroxide, an organic peroxide, or a redox-based initiator, which can initiate polymerization by heating, is preferable. These may be used alone or a combination of two or more kinds thereof may be used.

In a case where the polymerization initiator has an acid group, for example, it is preferable to react the polymerization initiator with a water-soluble inorganic base to form a salt of the acid group of the polymerization initiator.

As the acid group included in the polymerization initiator, one or more selected from $-CO_2H$, $-SO_3H$, and $-PO_4H$ are exemplary examples. Among these, from the viewpoint that it is easy to form a salt and adjust the pH of the reaction solution, $-CO_2H$ is preferable.

The polymerization initiator is preferably water-soluble. The water-soluble polymerization initiator is a polymerization initiator which can be dissolved in 100 g of water at 20° C. in an amount of 1 g or more.

Specifically, as the polymerization initiator, inorganic peroxides such as potassium persulfate, sodium persulfate, and ammonium persulfate; organic peroxides such as benzoyl peroxide and isobutyryl peroxide; azo compounds such as azobisisobutyronitrile, 4-methoxy-azobisvaleronitrile, and 4,4'-azobis(4-cyanopentanoic acid); and redox-based initiators in which an organic peroxide is combined with ferrous sulfate, a chelating agent, and a reducing agent, for example, those consisting of cumene hydroperoxide, ferrous sulfate, sodium pyrophosphate, and dextrose, and those in which t-butyl hydroperoxide, sodium formaldehyde sulfoxylate (Rongalite), ferrous sulfate, and disodium ethylenediaminetetraacetate are combined are exemplary examples. Among these, from the viewpoint of enhancing the reactivity of the RAFT polymerization using the RAFT agent according to the present aspect, 4,4'-azobis(4-cyanopentanoic acid) is preferable.

In a preparation liquid for forming the salt of the above-described RAFT agent, the amount of the above-described RAFT agent is, for example, preferably 0.001% to 10% by mass, more preferably 0.01% to 7.0% by mass, and still more preferably 0.03% to 5.0% by mass with respect to the total mass of the preparation liquid. In a case of being within the above-described suitable range, the reaction (saponification reaction) for forming the salt of the RAFT agent proceeds sufficiently, and a RAFT agent in a saponified state can be obtained.

The amount of the above-described RAFT agent before use of the RAFT polymerization reaction solution according to the first aspect, that is, before the addition of the polymerizable monomer is, for example, preferably 0.001% to 0.50% by mass, more preferably 0.01% to 0.20% by mass, $R^3$ in Formulae (1a) to (1j) is an organic group, and the same organic groups as those described for Z above are each exemplary examples. In the formulae, $M^+$'s each independently represent a monovalent cation. The type of the cation is not particularly limited, and cations of alkali metals such as sodium and potassium are exemplary examples.

As a particularly preferred RAFT agent with respect to the ethylenically unsaturated monomer, for example, a compound represented by Formula (1-1) is an exemplary example. Furthermore, as a particularly preferred RAFT agent with respect to a methacrylic acid ester, a compound represented by Formula (1-2) is an exemplary example. The definition of $M^+$ in the formulae is the same as described above.

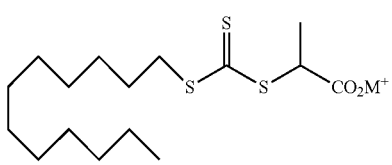

and still more preferably 0.03% to 0.10% by mass with respect to the total mass of the RAFT polymerization reaction solution before use. In a case of being within the above-described suitable range, the monomer in the reaction solution can be sufficiently subjected to the RAFT polymerization, and a polymer having a narrow molecular weight distribution can be obtained with a short reaction time. The amount of the coagulated matter remaining in the reaction solution after the reaction can be reduced.

The amount of the above-described polymerization initiator before use of the RAFT polymerization reaction solution according to the first aspect, that is, before the addition of the polymerizable monomer is, for example, preferably 0.001% to 0.50% by mass, more preferably 0.01% to 0.20% by mass, and still more preferably 0.03% to 0.10% by mass with respect to the total mass of the RAFT polymerization reaction solution before use. In a case of being within the above-described suitable range, the monomer in the reaction solution can be sufficiently subjected to the RAFT polymerization, and a polymer having a narrow molecular weight distribution can be obtained with a short reaction time. The amount of the coagulated matter remaining in the reaction solution after the reaction can be reduced.

The amount of water before use of the RAFT polymerization reaction solution according to the first aspect, that is, before the addition of the polymerizable monomer is, for example, preferably 80% by mass or more, more preferably 90% by mass or more, and still more preferably 95% by mass or more with respect to the total mass of the RAFT polymerization reaction solution before use. As a guideline for the upper limit value, for example, 99% by mass or less is an exemplary example. In a case of being within the above-described suitable range, the RAFT polymerization can be easily initiated by adding the monomer to the reaction solution.

The RAFT polymerization reaction solution according to the first aspect may contain a dispersion medium other than water and other additives to the extent that the RAFT polymerization is not inhibited, but it is preferable that the RAFT polymerization reaction solution does not contain the dispersion medium and the additives.

As the dispersion medium other than water, an organic solvent miscible with water (for example, alcohol) is an exemplary example. As the other additives, a surfactant and the like are exemplary examples.

Since the acid group included in the RAFT agent according to the present aspect forms a salt, the reactivity of the monomer is favorable. Therefore, the RAFT polymerization can be satisfactorily performed without using a surfactant.

<Production of RAFT Polymerization Reaction Solution According to First Aspect>

The preparation of the salt of the above-described RAFT agent is carried out at a temperature of preferably 20° C. to 100° C. and more preferably 25° C. to 90° C. At these suitable preparation temperatures, the time required for the preparation to be completed is approximately 10 to 300 minutes. Within the above-described ranges, a RAFT agent preparation liquid dissolved or dispersed in water is obtained.

The RAFT polymerization reaction solution according to the first aspect may contain a polymerization initiator as an optional component. The polymerization initiator may be added at the time of preparing the RAFT polymerization reaction solution, may be added together with the polymerizable monomer described below, or may be separately prepared. It is preferable that the polymerization initiator is separately prepared, and the preparation temperature is preferably a 10-hour half-life temperature or lower of a thermal decomposition polymerization initiator, for example, 20° C. to 60° C. A guideline of the preparation time is approximately 5 to 300 minutes. Within the above-described ranges, a preparation liquid of the polymerization initiator, which is dissolved or dispersed in water or the monomer described above, is obtained.

The RAFT polymerization reaction solution according to the first aspect is obtained by blending the above-described RAFT agent or a solution thereof, water, the above-described water-soluble inorganic base, and the above-described polymerization initiator as necessary by a normal method with a desired proportion. As an example, first, the above-described RAFT agent, water, and the above-described water-soluble inorganic base are blended to obtain a solution in which a salt of the acid group included in the above-described RAFT agent is formed (hereinafter, may be referred to as a saponified RAFT agent aqueous solution). Next, the above-described polymerization initiator, water, and the above-described water-soluble inorganic base are blended to obtain a solution in which a salt of the acid group included in the above-described polymerization initiator is formed (hereinafter, referred to as an initiator aqueous solution). Finally, the saponified RAFT agent aqueous solution and the initiator aqueous solution are mixed to obtain the RAFT polymerization reaction solution according to the present aspect, in which the ratio of M3/(M1+M2) described above is adjusted to a predetermined proportion.

<Use of RAFT Polymerization Reaction Solution According to First Aspect>

By adding a polymerizable monomer to the RAFT polymerization reaction solution according to the first aspect and performing the RAFT polymerization, a living radical polymerization reaction occurs due to the action of the RAFT agent, and a polymer having a narrow molecular weight distribution (Mw/Mn) can be obtained with a short reaction time. The amount of residue (coagulated matter) remaining in the reaction solution after the reaction as an impurity can be reduced.

The above-described monomer is preferably a monomer capable of radical polymerization, and is more preferably an ethylenically unsaturated monomer from the viewpoint of favorable reactivity. As the ethylenically unsaturated monomer, a monomer represented by Formula (10) is an exemplary example.

(10)

In Formula (10), U and W are each independently selected from the group consisting of —$CO_2H$, —$CO_2R^2$, —$COR^2$, —$CSR^2$, —$CSOR^2$, —$COSR^2$, —$CONH_2$, —$CONHR^2$, —$CON(R^2)_2$, hydrogen, halogen, and C1 to C4 alkyl which may be substituted (provided that each substituent can be selected from hydroxy, —$CO_2H$, —$CO_2R^2$, —$COR^2$, —$CSR^2$, —$CSOR^2$, —$COSR^2$, —CN, —$CONH_2$, —$CONHR^2$, —$CON(R^2)_2$, —$OR^2$, —$SR^2$, —$O_2CR^2$, —$SCOR^2$, and —$OCSR^2$).

In Formula (10), V is selected from the group consisting of hydrogen, —$R^2$, —$CO_2H$, —$CO_2R^2$, —$COR^2$, —$CSR^2$, —$CSOR^2$, —$COSR^2$, —$CONH_2$, —$CONHR^2$, —$CON(R^2)_2$, —$OR^2$, —$SR^2$, —$O_2CR^2$, —$SCOR_2$, and —$OCSR_2$.

$R^2$ in U, W, and V of Formula (10) is selected from the group consisting of C1 to C18 alkyl which may be substituted, C2 to C18 alkenyl which may be substituted, aryl which may be substituted, heteroaryl which may be substituted, carbocyclyl which may be substituted, heterocyclyl which may be substituted, aralkyl which may be substituted, heteroarylalkyl which may be substituted, alkaryl which may be substituted, alkylheteroaryl which may be substituted, and a polymer chain. Here, each substituent is selected from the group consisting of alkyleneoxy (epoxy), hydroxy, alkoxy, acyl, acyloxy, formyl, alkylcarbonyl, carboxy, sulfonic acid, alkoxy- or aryloxy-carbonyl, isocyanato, cyano, silyl, halo, and amino (including salts and derivatives thereof). As a preferred polymer chain, polyalkylene oxide, polyarylene ether, and polyalkylene ether are exemplary examples.

In the present specification, the term "carbocyclyl" means any ring system in which all ring atoms are carbon, preferably containing 3 to 12 carbon atoms, more preferably containing 3 to 10 carbon atoms, and still more preferably containing 3 to 8 carbon atoms. The carbocyclyl group may be saturated or partially unsaturated, but does not contain an aromatic ring.

In the present specification, the term "heterocyclyl" refers to a group in which one or more atoms constituting a ring of the carbocyclyl group are substituted with a heteroatom selected from nitrogen, oxygen, and sulfur.

In the present specification, the term "aralkyl" refers to a group in which one or more hydrogen atoms of an alkyl group are substituted with an aryl group.

In the present specification, the term "alkaryl" refers to a group in which one or more hydrogen atoms of an aryl group are substituted with an alkyl group.

Specifically as the monomer, maleic anhydride, N-alkylmaleimide, N-arylmaleimide, dialkyl fumarate and ring-polymerizable monomers, acrylate ester, methacrylate ester, acrylic acid, methacrylic acid, styrene, acrylamide, methacrylamide, acrylonitrile, methacrylonitrile, a mixture of these monomers, and a mixture of these monomers and other monomers are exemplary examples. The selection of the comonomer is appropriately determined by three-dimensional properties and electronic properties thereof. The factors that determine copolymerizability of various monomers are sufficiently described in the literature in the related art.

More specifically, as the monomer, methyl methacrylate, ethyl methacrylate, propyl methacrylate (and all isomers thereof), butyl methacrylate (and all isomers thereof), 2-ethylhexyl methacrylate, isobornyl methacrylate, methacrylic acid, benzyl methacrylate, phenyl methacrylate, phenoxyethyl methacrylate, methacrylonitrile, α-methylstyrene, methyl acrylate, ethyl acrylate, propyl acrylate (and all isomers thereof), butyl acrylate (and all isomers thereof), 2-ethylhexyl acrylate, isobornyl acrylate, acrylic acid, benzyl acrylate, phenyl acrylate, phenoxyethyl acrylate, acrylonitrile, styrene, functional methacrylate, acrylates and styrenes selected from glycidyl methacrylate, 2-hydroxyethyl methacrylate, hydroxypropyl methacrylate (and all isomers thereof), hydroxybutyl methacrylate (and all isomers thereof), N,N-dimethylaminoethyl methacrylate, N,N-diethylaminoethyl methacrylate, triethylene glycol methacrylate, itaconic anhydride, itaconic acid, glycidyl acrylate, 2-hydroxyethyl acrylate, hydroxypropyl acrylate (and all isomers thereof), hydroxybutyl acrylate (and all isomers thereof), N,N-dimethylaminoethyl acrylate, N,N-diethylaminoethyl acrylate, triethylene glycol acrylate, methacrylamide, N-methylacrylamide, N,N-dimethylacrylamide, N-tert-butyl methacrylamide, N-n-butyl methacrylamide, N-methol methacrylamide, N-ethylol methacrylamide, N-tert-butyl acrylamide, N-n-butyl acrylamide, N-methol acrylamide, N-ethylol acrylamide, vinyl benzoate (and all isomers thereof), diethylaminostyrene (and all isomers thereof), α-methylvinyl benzoate (and all isomers thereof), diethylamino α-methylstyrene (and all isomers thereof), p-vinylbenzenesulfonic acid, sodium salt of p-vinylbenzenesulfonic acid, trimethoxysilylpropyl methacrylate, triethoxysilylpropyl methacrylate, tributoxysilylpropyl methacrylate, dimethoxymethylsilylpropyl methacrylate, diethoxymethylsilylpropyl methacrylate, dibutoxymethylsilylpropyl methacrylate, diisopropoxymethylsilylpropyl methacrylate, dimethoxysilylpropyl methacrylate, diethoxysilylpropyl methacrylate, dibutoxysilylpropyl methacrylate, diisopropoxysilylpropyl methacrylate, trimethoxysilylpropyl acrylate, triethoxysilylpropyl acrylate, tributoxysilylpropyl acrylate, dimethoxymethylsilylpropyl acrylate, diethoxymethylsilylpropyl acrylate, dibutoxymethylsilylpropyl acrylate, diisopropoxymethylsilylpropyl acrylate, dimethoxysilylpropyl acrylate, diethoxysilylpropyl acrylate, dibutoxysilylpropyl acrylate, diisopropoxysilylpropyl acrylate, vinyl acetate, vinyl butyrate, vinyl benzoate, vinyl chloride, vinyl fluoride, vinyl bromide, maleic anhydride, N-phenylmaleimide, N-butylmaleimide, N-vinylpyrrolidone, N-vinylcarbazole, butadiene, ethylene, and chloroprene are exemplary examples. These may be used alone or a combination of two or more kinds thereof may be used.

The amount of the above-described monomer to be added to the RAFT polymerization reaction solution according to the first aspect is, for example, preferably 1 to 100 parts by mass, more preferably 5 to 50 parts by mass, and still more preferably 10 to 25 parts by mass with respect to 1 part by mass of the above-described RAFT agent contained in the reaction solution. In a case of being within the above-described suitable range, the above-described effects can be further obtained.

The amount of water with respect to the total mass of the reaction solution after the addition of the above-described monomer to the RAFT polymerization reaction solution according to the first aspect is, for example, preferably 50% by mass or more and more preferably 60% by mass or more.

From the viewpoint of increasing the monomer reaction rate in the RAFT polymerization in the above-described reaction solution, reducing the volume-average particle diameter of a polymer (polymer-type RAFT agent) obtained by the RAFT polymerization, reducing the amount of the coagulated matter, and shortening the reaction time, the content of water is preferably as high as possible, for example, 80% by mass or more is preferable, 90% by mass or more is more preferable, 95% by mass or more is still more preferable, and 98% by mass or more is particularly preferable. As a guideline for the upper limit value in this case, for example, 99.5% by mass or less is an exemplary example.

Conversely, from the viewpoint of increasing the volume-average particle diameter of the polymer (polymer-type RAFT agent) obtained by the RAFT polymerization in the above-described reaction solution, the content of water is preferably as small as possible, for example, 97% by mass or less, more preferably 92% by mass or less, still more preferably 85% by mass or less, and particularly preferably 75% by mass or less. As a guideline for the lower limit value in this case, for example, 50% by mass is an exemplary example.

The reaction temperature in the RAFT reaction using the RAFT polymerization reaction solution according to the first aspect is, for example, preferably 60° C. to 100° C. and more preferably 70° C. to 90° C. The reaction time until the completion of the RAFT reaction at these suitable reaction temperatures is approximately 200 to 1,500 minutes.

Other reaction conditions in the RAFT reaction using the RAFT polymerization reaction solution according to the first aspect are appropriately set with reference to the RAFT polymerization in the related art.

Further detailed examples of the RAFT polymerization using the RAFT polymerization reaction solution according to the first aspect are shown in Examples 1a to 19a and the like described later.

The reaction solution after the RAFT polymerization using the RAFT polymerization reaction solution according to the first aspect is one embodiment of the RAFT polymerization reaction solution according to the second aspect of the present invention, which will be described below.

A polymer-type RAFT agent described below is obtained by the RAFT polymerization using the RAFT polymerization reaction solution according to the first aspect.

<<Second Aspect>>

A second aspect of the present invention is a RAFT polymerization reaction solution containing a polymer-type RAFT agent represented by Formula (2), water, and a water-soluble inorganic base, in which at least a part of an acid group included in the polymer-type RAFT agent forms a salt with a cation component of the water-soluble inorganic base.

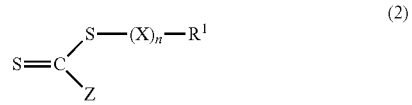

(2)

[in Formula (2), $R^1$ represents an organic group, the organic group has one or more acid groups selected from —$CO_2H$, —$SO_3H$, and —$PO_4H$, Z represents an organic group selected from an alkyl group, an aryl group, an arylalkyl group, an alkylthio group, an arylthio group, and an arylalkylthio group, a part of the organic group represented by Z may be substituted, X represents a repeating unit of any ethylenically unsaturated monomer, n represents an integer of 1 to 10,000 (from the viewpoint of reducing the amount of coagulated matter, 1 to 200 is preferable and 1 to 100 is more preferable), and in a case where n is 2 or more, a plurality of X's may be the same or different from each other]

Since the descriptions of $R^1$ and Z in Formula (2) are the same as the descriptions of $R^1$ and Z in Formula (1) of the first aspect, the same descriptions will not be repeated here.

As the any ethylenically unsaturated monomer represented by X, the above-described examples are exemplary examples. Among these, since the RAFT polymerization using the polymer-type RAFT agent is facilitated, styrene, acrylonitrile, methyl (meth)acrylate, butyl (meth)acrylate, or (meth)acrylic acid is preferable. These may be used alone or a combination of two or more kinds thereof may be used.

In a case where X to which $R^1$ is bonded is an ethylenically unsaturated monomer and $R^1$ derived from the RAFT agent is an organic group having a carbon atom A bonded to X, the carbon atom A of the organic group is preferably tertiary. In a case where the carbon atom is tertiary, a substituent substituted to a hydrogen atom of the carbon atom A is preferably a linear or branched alkyl group having 1 to 6 carbon atoms, and more preferably a linear alkyl group having 1 to 3 carbon atoms. In these suitable cases, the subsequent RAFT polymerization using the polymer-type RAFT agent is facilitated.

In a case where X to which $R^1$ is bonded is a methacrylic acid ester and $R^1$ derived from the RAFT agent is an organic group having a carbon atom B bonded to X, the carbon atom B of the organic group is preferably quaternary. In a case where the carbon atom is quaternary, two substituents substituted to a hydrogen atom of the carbon atom B are each independently preferably a linear or branched alkyl group having 1 to 6 carbon atoms, and more preferably a linear alkyl group having 1 to 3 carbon atoms. Furthermore, it is preferable that at least one hydrogen atom of the alkyl group constituting the above-described substituent is substituted with a cyano group. As a particularly preferred example thereof, an example in which the above-described carbon atom B is a quaternary carbon atom in which an alkyl group having 1 to 3 carbon atoms and a cyano group are bonded is an exemplary example. In these suitable cases, the subsequent RAFT polymerization using the polymer-type RAFT agent is facilitated.

It is preferable that the acid group which has formed the above-described salt is bonded to the above-described carbon atom A or the above-described carbon atom B directly or through a linking group. As the above-described linking group, a linear or branched alkylene group having 1 to 6 carbon atoms is an exemplary example. Any methylene group constituting the above-described alkylene group may be substituted with —O—, —C(=O)O—, —OC(=O)—, or —C(=O)NH— (provided that a case where oxygen atoms are bonded to each other is excluded).

The number of repeating units represented by n is preferably 5 or more, more preferably 10 or more, still more preferably 20 or more, particularly preferably 30 or more, and most preferably 40 or more. Here, the number of repeating units is the number of repeating units in the total of one or more kinds of monomers corresponding to X.

In a case where n is equal to or more than the above-described lower limit value, the polymerized moiety $(X)_n$ can exhibit a function as a block of the polymer.

The above-described polymer-type RAFT agent can form particles in the RAFT polymerization reaction solution. The volume-average particle diameter thereof is preferably 5 to 500 nm, more preferably 7 to 100 nm, and still more preferably 10 to 50 nm. In a case of being within the above-described suitable range, dispersibility of the polymer-type RAFT agent in water is enhanced, and the reaction time can be shortened, which is advantageous.

The volume-average particle diameter (MV) of the polymer-type RAFT agent contained in the RAFT polymerization reaction solution according to the present aspect is obtained from an average particle diameter (volume-average particle diameter), which is calculated from a particle size distribution of the polymer in a latex, which is measured by a dynamic light scattering method (solvent: water, temperature: 25° C.) using Nanotrac UPA-EX150 manufactured by Nikkiso Co., Ltd.

A molecular weight distribution of the above-described polymer-type RAFT agent, represented by Mw/Mn, is preferably as narrow as possible, and is preferably 2.0 or less, more preferably 1.8 or less, still more preferably 1.6 or less, particularly preferably 1.4 or less, and most preferably 1.2 or less. Usually, the lower limit value of the molecular weight distribution is 1.0 or more.

The molecular weight distribution of the polymer-type RAFT agent contained in the RAFT polymerization reaction solution according to the present aspect can be obtained by coagulating a latex at 60° C. to 95° C. using calcium chloride as a coagulating agent, dewatering, washing, and drying the latex, dissolving the latex in tetrahydrofuran, and then obtaining Mw and Mn by GPC in terms of standard polystyrene.

The pH of the RAFT polymerization reaction solution according to the second aspect is preferably 8 to 13. The pH is a value measured at 25° C. by a method specified in JIS Z 8802:2011. In the present specification, the pH is represented by an integer, and is valid up to the first decimal place. That is, the first decimal place of the measured value is a value rounded off.

The pH of the RAFT polymerization reaction solution according to the second aspect is preferably 8 to 13, more preferably 10 to 13, still more preferably 11 to 13, and particularly preferably 12 to 13. In a case of being within the above-described suitable range, the molecular weight distribution of the polymer formed by the RAFT polymerization can be further narrowed.

The amount of the above-described polymer-type RAFT agent before use of the RAFT polymerization reaction solution according to the second aspect, that is, before the addition of the polymerizable monomer is, for example, preferably 0.01% to 10.0% by mass, more preferably 0.1% to 5.0% by mass, and still more preferably 0.5% to 3.0% by mass with respect to the total mass of the RAFT polymerization reaction solution according to the second aspect before use. In a case of being within the above-described suitable range, the monomer in the reaction solution can be sufficiently subjected to the RAFT polymerization, and a polymer having a narrow molecular weight distribution can be obtained with a short reaction time. The amount of the coagulated matter remaining in the reaction solution after the reaction can be reduced.

The above-described polymer-type RAFT agent contained in the RAFT polymerization reaction solution according to the second aspect may be one kind or may be two or more kinds.

A polymerization initiator may be added at the time of using the RAFT polymerization reaction solution according to the second aspect. The amount of the polymerization initiator to be added can be, for example, 0.01% to 0.1% by mass with respect to the total mass of the RAFT polymerization reaction solution according to the second aspect before the addition of the polymerizable monomer. It is preferable to appropriately set the above-described amount to be equimolar with the amount of the polymer-type RAFT agent, and for example, from the viewpoint of achieving stable RAFT polymerization, it is preferable to add the polymerization initiator in an amount of appropriately 1 to 5 parts by mass with respect to 100 parts by mass of the polymer-type RAFT agent.

The polymerization initiator to be added to the RAFT polymerization reaction solution according to the second aspect may be one kind or two or more kinds.

The amount of water before use of the RAFT polymerization reaction solution according to the second aspect, that is, before the addition of the polymerizable monomer is, for example, preferably 80% by mass or more, more preferably 90% by mass or more, and still more preferably 95% by mass or more with respect to the total mass of the RAFT polymerization reaction solution before use. As a guideline for the upper limit value, for example, 99% by mass or less is an exemplary example. In a case of being within the above-described suitable range, the RAFT polymerization can be easily initiated by adding the monomer to the reaction solution.

The RAFT polymerization reaction solution according to the second aspect may contain a dispersion medium other than water and other additives to the extent that the RAFT polymerization is not inhibited, but it is preferable that the RAFT polymerization reaction solution does not contain the dispersion medium and the additives.

As the dispersion medium other than water, an organic solvent miscible with water (for example, alcohol) is an exemplary example. As the other additives, a surfactant and the like are exemplary examples.

Since the acid group included in the polymer-type RAFT agent according to the present aspect forms a salt, the reactivity of the monomer is favorable. Therefore, the RAFT polymerization can be satisfactorily performed without using a surfactant.

<Production of RAFT Polymerization Reaction Solution According to Second Aspect>

The RAFT polymerization reaction solution according to the second aspect is obtained by adding a polymerizable monomer to the RAFT polymerization reaction solution according to the first aspect and performing RAFT polymerization. The specific method is as described above.

<Use of RAFT Polymerization Reaction Solution According to Second Aspect>

By adding one or more polymerizable monomers to the RAFT polymerization reaction solution according to the second aspect and performing the RAFT polymerization, a living radical polymerization reaction occurs due to the action of the polymer-type RAFT agent in the aqueous system, and a polymer having a narrow molecular weight distribution can be obtained with a short reaction time. The amount of residue (coagulated matter) remaining in the reaction solution after the reaction as an impurity can be reduced.

As the above-described monomer, the monomers described in the first aspect are exemplary examples. By using a monomer of a different kind or a different formulation from the ethylenically unsaturated monomer represented by X, which constitutes the above-described polymer-type RAFT agent, a diblock copolymer including a block different from the block represented by $(X)_n$ in Formula (2) is obtained.

The amount of the above-described monomer to be added to the RAFT polymerization reaction solution according to the second aspect is, for example, preferably 1 to 90 parts by mass, more preferably 5 to 60 parts by mass, and still more preferably 9 to 30 parts by mass with respect to 1 part by mass of the above-described polymer-type RAFT agent contained in the reaction solution. In a case of being within the above-described suitable range, the molecular weight distribution of the generated polymer is further narrowed.

The reaction temperature in the RAFT reaction using the RAFT polymerization reaction solution according to the second aspect is, for example, preferably 60° C. to 100° C. and more preferably 70° C. to 90° C. The reaction time until the completion of the RAFT reaction at these suitable reaction temperatures is approximately 60 to 600 minutes.

Other reaction conditions in the RAFT reaction using the RAFT polymerization reaction solution according to the second aspect are appropriately set with reference to the RAFT polymerization in the related art.

Further detailed examples of the RAFT polymerization using the RAFT polymerization reaction solution according to the second aspect are shown in Examples 1b to 19b and the like described later.

The reaction solution after the RAFT polymerization using the RAFT polymerization reaction solution according to the second aspect is one embodiment of the RAFT polymerization reaction solution according to the third aspect of the present invention, which will be described below.

A hydrophilic copolymer-type RAFT agent described below is obtained by the RAFT polymerization using the RAFT polymerization reaction solution according to the second aspect.

<<Third Aspect>>

A third aspect of the present invention is a RAFT polymerization reaction solution containing a hydrophilic copolymer-type RAFT agent represented by Formula (3), water, and a water-soluble inorganic base.

At least a part of an acid group included in the above-described hydrophilic copolymer-type RAFT agent forms a salt with a cation component of the water-soluble inorganic base.

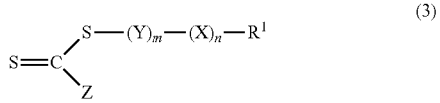

(3)

[in Formula (3), $R^1$ represents an organic group, the organic group has one or more acid groups selected from —$CO_2H$, —$SO_3H$, and —$PO_4H$, Z represents an organic group selected from an alkyl group, an aryl group, an arylalkyl group, an alkylthio group, an arylthio group, and an arylalkylthio group, a part of the organic group represented by Z may be substituted, X represents a repeating unit of any ethylenically unsaturated monomer, n represents an integer of 1 to 100, in a case where n is 2 or more, a plurality of X's may be the same or different from each other, Y represents a repeating unit of any ethylenically unsaturated monomer, m represents an integer of 10 to 10,000, a plurality of Y's may be the same or different from each other, and a polymer chain represented by $(X)_n$ is different from a polymer chain represented by $(Y)_m$]

Since the descriptions of $R^1$ and Z in Formula (3) are the same as the descriptions of $R^1$ and Z in Formula (1) of the first aspect, the same descriptions will not be repeated here.

Since the descriptions of X and n in Formula (3) are the same as the descriptions of X and n in Formula (2) of the second aspect, the same descriptions will not be repeated here.

As the any ethylenically unsaturated monomer represented by Y, the above-described examples are exemplary examples. Among these, since the RAFT polymerization using a hydrophilic copolymer-type RAFT agent is facilitated, styrene, acrylonitrile, butyl acrylate, or (meth)acrylic acid is preferable.

These may be used alone or a combination of two or more kinds thereof may be used.

The number of repeating units represented by m is preferably 50 or more, more preferably 100 or more, still more preferably 200 or more, particularly preferably 300 or more, and most preferably 400 or more. Here, the number of repeating units is the number of repeating units in the total of one or more kinds of monomers corresponding to Y.

In a case where m is equal to or more than the above-described lower limit value, the polymerized moiety $(Y)_m$ can exhibit a function as a block of the polymer.

The above-described hydrophilic copolymer-type RAFT agent can form particles in the RAFT polymerization reaction solution. The volume-average particle diameter thereof is preferably 10 to 500 nm, more preferably 15 to 300 nm, and still more preferably 20 to 200 nm. In a case of being within the above-described suitable range, dispersibility of the hydrophilic copolymer-type RAFT agent in water is enhanced, and the reaction time can be shortened, which is advantageous.

The volume-average particle diameter (MV) of the hydrophilic copolymer-type RAFT agent contained in the RAFT polymerization reaction solution according to the present aspect is obtained from an average particle diameter (volume-average particle diameter), which is calculated from a particle size distribution of the polymer in a latex, which is measured by a dynamic light scattering method (solvent: water, temperature: 25° C.) using Nanotrac UPA-EX150 manufactured by Nikkiso Co., Ltd.

A molecular weight distribution of the above-described hydrophilic copolymer-type RAFT agent, represented by Mw/Mn, is preferably as narrow as possible, and is preferably 3.0 or less, more preferably 2.5 or less, still more preferably 2.0 or less, particularly preferably 1.8 or less, and most preferably 1.6 or less. Usually, the lower limit value of the molecular weight distribution is 1.0 or more.

The molecular weight distribution of the hydrophilic copolymer-type RAFT agent contained in the RAFT polymerization reaction solution according to the present aspect can be obtained by coagulating a latex at 60° C. to 95° C. using calcium chloride as a coagulating agent, dewatering, washing, and drying the latex, dissolving the latex in tetrahydrofuran, and then obtaining Mw and Mn by GPC in terms of standard polystyrene.

The pH of the RAFT polymerization reaction solution according to the third aspect is preferably 8 to 13 and more preferably 7 to 13. In this range, dispersibility of the hydrophilic copolymer-type RAFT agent in the RAFT polymerization reaction solution is further improved. The method of measuring the pH is as described above.

The amount of the above-described hydrophilic copolymer-type RAFT agent before use of the RAFT polymerization reaction solution according to the third aspect, that is, before the addition of the polymerizable monomer is, for example, preferably 0.1% to 20.0% by mass, more preferably 1.0% to 15.0% by mass, and still more preferably 5.0% to 10.0% by mass with respect to the total mass of the RAFT polymerization reaction solution according to the third aspect before use. In a case of being within the above-described suitable range, the monomer in the reaction solution can be sufficiently subjected to the RAFT polymerization, and a polymer having a narrow molecular weight distribution can be obtained with a short reaction time. The amount of the coagulated matter remaining in the reaction solution after the reaction can be reduced.

The above-described hydrophilic copolymer-type RAFT agent contained in the RAFT polymerization reaction solution according to the third aspect may be one kind or may be two or more kinds.

A polymerization initiator may be added at the time of using the RAFT polymerization reaction solution according to the third aspect. The amount of the polymerization initiator to be added can be, for example, 0.01% to 0.1% by mass with respect to the total mass of the RAFT polymerization reaction solution according to the third aspect before the addition of the polymerizable monomer. The amount thereof can be appropriately set according to the amount of the hydrophilic copolymer-type RAFT agent.

The polymerization initiator to be added to the RAFT polymerization reaction solution according to the third aspect may be one kind or two or more kinds.

The amount of water before use of the RAFT polymerization reaction solution according to the third aspect, that is, before the addition of the polymerizable monomer is, for example, preferably 60% by mass or more, more preferably 70% by mass or more, and still more preferably 80% by mass or more with respect to the total mass of the RAFT polymerization reaction solution before use. As a guideline for the upper limit value, for example, 99% by mass or less is an exemplary example. In a case of being within the above-described suitable range, the RAFT polymerization can be easily initiated by adding the monomer to the reaction solution.

The RAFT polymerization reaction solution according to the third aspect may contain a dispersion medium other than water and other additives to the extent that the RAFT polymerization is not inhibited, or may not contain the dispersion medium and the additives. As the dispersion medium other than water, an organic solvent miscible with water (for example, alcohol) is an exemplary example.

As the other additives, a surfactant and the like are exemplary examples.

Since the acid group included in the hydrophilic copolymer-type RAFT agent according to the present aspect forms a salt, the reactivity of the monomer is favorable. Therefore, the RAFT polymerization can be satisfactorily performed without using a surfactant.

<Production of RAFT Polymerization Reaction Solution According to Third Aspect>

The RAFT polymerization reaction solution according to the third aspect is obtained by adding a polymerizable monomer to the RAFT polymerization reaction solution according to the second aspect and performing RAFT polymerization. The specific method is as described above.

<Use of RAFT Polymerization Reaction Solution According to Third Aspect>

By adding one or more polymerizable monomers to the RAFT polymerization reaction solution according to the third aspect and performing the RAFT polymerization, a living radical polymerization reaction occurs due to the action of the hydrophilic copolymer-type RAFT agent, and a polymer having a narrow molecular weight distribution can be obtained with a short reaction time. The amount of residue (coagulated matter) remaining in the reaction solution after the reaction as an impurity can be reduced. Similarly, a random multi-stage block copolymer solution can be obtained by further polymerizing a monomer using the obtained polymer solution as a RAFT polymerization reaction solution.

As the above-described monomer, the monomers described in the first aspect are exemplary examples. By using a monomer of a different kind or a different formulation from the ethylenically unsaturated monomers represented by X and Y, which constitute the above-described hydrophilic copolymer-type RAFT agent, a triblock copolymer including a block different from the block represented by $(X)_n$ and the block represented by $(Y)m$ in Formula (3) is obtained.

The amount of the above-described monomer to be added to the RAFT polymerization reaction solution according to the third aspect is, for example, preferably 1 to 90 parts by mass, more preferably 3 to 60 parts by mass, and still more preferably 6 to 30 parts by mass with respect to 1 part by mass of the above-described hydrophilic copolymer-type RAFT agent contained in the reaction solution. In a case of being within the above-described suitable range, the molecular weight distribution of the generated polymer is further narrowed.

The reaction temperature in the RAFT reaction using the RAFT polymerization reaction solution according to the third aspect is, for example, preferably 60° C. to 100° C. and more preferably 70° C. to 90° C. The reaction time until the completion of the RAFT reaction at these suitable reaction temperatures is approximately 60 to 600 minutes.

Other reaction conditions in the RAFT reaction using the RAFT polymerization reaction solution according to the third aspect are appropriately set with reference to the RAFT polymerization in the related art.

Further detailed examples of the RAFT polymerization using the RAFT polymerization reaction solution according to the third aspect are shown in Examples 1c to 19c and the like described later.

<Method for Recovering Polymer from RAFT Polymerization Reaction Solution>

The block copolymer can be recovered from the RAFT polymerization reaction solutions according to the second aspect and the third aspect and the reaction solutions after use thereof (hereinafter, may be collectively referred to as an aqueous dispersion) as necessary.

As a method of recovering the block copolymer from the aqueous dispersion, (i) a method of recovering the block copolymer by injecting the aqueous dispersion of the block copolymer into hot water in which a coagulating agent is dissolved and coagulating the aqueous dispersion into a slurry state (wet method); (ii) a method of semi-directly recovering the block copolymer by spraying the aqueous dispersion of the block copolymer in a heating atmosphere (spray dry method); and the like are exemplary examples.

As the coagulating agent, inorganic acids such as sulfuric acid, hydrochloric acid, phosphoric acid, and nitric acid, and metal salts such as calcium chloride, calcium acetate, and aluminum sulfate are exemplary examples. The coagulating agent is selected in accordance with an emulsifier used in the polymerization. That is, in a case where only a carboxylic acid soap such as a fatty acid soap and a rosin soap is used, any coagulating agent may be used. In a case where an emulsifier which exhibits stable emulsifying power even in an acidic region, such as sodium dodecylbenzene sulfonate, is contained, it is necessary to use a metal salt.

As a method of obtaining a block copolymer in a dry state from the block copolymer in a slurry state, (i) a method in which an emulsifier residue remaining in the slurry is eluted into water by washing, and then the slurry is dewatered by a centrifugal hydroextractor or a press hydroextractor and further dried with an air flow dryer or the like; (ii) a method in which dewatering and drying are simultaneously performed by a compression hydroextractor, an extruder, or the like; and the like are exemplary examples. After the drying, the block copolymer is obtained in a powder form or a particulate form. In addition, the block copolymer discharged from the compression hydroextractor or the extruder can also be directly sent to an extruder or a molding machine for producing a thermoplastic resin composition.

<<Thermoplastic Resin Composition>>

The polymer obtained by the above-described RAFT polymerization using the RAFT polymerization reaction solutions according to the first aspect to the third aspect can be a thermoplastic resin reflecting characteristics of each block constituting the polymer. Other optional components can be added to the thermoplastic resin as necessary to obtain a thermoplastic resin composition.

As the other optional components, components which can be blended in a known thermoplastic resin composition are exemplary examples, examples of which include a metal component, a thermoplastic resin other than the above-described polymer, and an additive.

As the metal component, alkali metals such as sodium and potassium are exemplary examples.

As other thermoplastic resins, for example, polycarbonate, polybutylene terephthalate (PBT), polyethylene terephthalate (PET), polyvinyl chloride, polystyrene, polyacetal, modified polyphenylene ether (modified PPE), ethylene-vinyl acetate copolymer, polyarylate, liquid crystal polyester, polyethylene, polypropylene, fluororesin, and polyamide (nylon) are exemplary examples.

As the additive, for example, an antioxidant, a lubricant, a processing aid, a pigment, a dye, a filler, a silicone oil, and a paraffin oil are exemplary examples.

<Thermoplastic Resin Composition Production Method>

A thermoplastic resin composition production method is not particularly limited, and for example, a thermoplastic resin obtained by RAFT polymerization and other optional components as necessary are mixed and dispersed by a V-type blender, a Henschel mixer, or the like, and the mixture thus obtained is melt-kneaded using a melt-kneader such as a screw-type extruder, a Banbury mixer, a pressure kneader, and a mixing roll, thereby obtaining a thermoplastic resin composition. After the melt-kneading, the melt-kneaded product may be pelletized using a pelletizer or the like, as necessary.

<<Molded Product>>

In the present specification, a term "molded product" means a product obtained by molding a thermoplastic resin composition.

The molded product is obtained by molding the above-described thermoplastic resin composition by a known molding method. As the molding method, for example, an injection molding method, a press molding method, an extrusion molding method, a vacuum molding method, and a blow molding method are exemplary examples.

As the use of the molded product, vehicle interior and exterior parts, office equipment, home appliances, building materials, and the like are exemplary examples.

<<Fourth Aspect>>

A fourth aspect of the present invention is a RAFT polymerization reaction solution production method including a step 1 and a step 2. The step 1 and the step 2 according to the present aspect are not limited to the examples of the following embodiments, and various modifications can be made within the scope of the gist of the present invention. The wording of "step to obtain . . . " in the present aspect may be rephrased as "to obtain".

<Step 1>

The step 1 is mixing a RAFT agent having an acid group, which is represented by Formula (1), water, and a water-soluble inorganic base with each other to form a salt of at least a part of the acid group included in the RAFT agent and a cation derived from the water-soluble inorganic base and to obtain a RAFT agent aqueous solution in which the RAFT agent is dissolved in water.

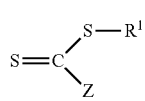

(1)

[in Formula (1), $R^1$ represents an organic group, the organic group has one or more acid groups selected from $-CO_2H$, $-SO_3H$, and $-PO_4H$, Z represents an organic group selected from an alkyl group, an aryl group, an arylalkyl group, an alkylthio group, an arylthio group, and an arylalkylthio group, and a part of the organic group represented by Z may be substituted]

The organic group represented by $R^1$ is not particularly limited as long as the organic group has the above-described acid group, and any organic group can be adopted. For example, an organic group having a linear or branched monovalent alkyl group of C1 to C10 as a basic skeleton, in which any one or more hydrogen atoms of the alkyl group is substituted with the above-described acid group, is an exemplary example. Any one or more methylene groups constituting the above-described alkyl group may be substituted with $-O-$, $-C(=O)O-$, $-OC(=O)-$, or $-C(=O)NH-$ (provided that a case where oxygen atoms are bonded to each other is excluded).

Any one or more hydrogen atoms of the above-described alkyl group may be substituted with $-CN$.

Specifically, as $R^1$, for example, $-CH_2CO_2H$, $-CH_2CH_2CO_2H$, $-CH(CH_3)CO_2H$, $-CH(CO_2H)CH_2CO_2H$, $-C(CH_3)(CH_3)CO_2H$, $-C(CN)(CH_3)CH_2CH_2CO_2H$, and $-CH(CH_3)CONR^aR^b$ are exemplary examples.

$R^a$ and $R^b$ are each independently H, a C1 to C6 alkyl group, a C1 to C6 alkoxy group, a C6 to C12 aryl group, a C7 to C18 alkylaryl group, or a C6 to C12 heteroaryl group. However, at least one hydrogen atom included in $R^a$ and $R^b$ is substituted with an acid group selected from $-CO_2H$, $-SO_3H$, or $-PO_4H$. $R^a$ and $R^b$ may be the same or different from each other.

The description of the organic group represented by Z is the same as the description of Z in Formula (1) according to the first aspect described above, and thus the same description will not be repeated here.

As the RAFT agent of the step 1, a known RAFT agent can be adopted. However, since an acid group of the known RAFT agent does not form a salt, in the step 1, by mixing the RAFT agent with water and the water-soluble inorganic base, a salt of a cation derived from the water-soluble inorganic base and at least a part of the acid group included in the RAFT agent is formed. As a result, a RAFT agent aqueous solution in which the RAFT agent having an acid group forming a salt is dissolved in water is obtained.

The type of cation derived from the water-soluble inorganic base is not particularly limited, and cations of alkali metals such as sodium and potassium, cations of alkaline earth metals such as magnesium and calcium, and the like are exemplary examples. From the viewpoint of enhancing the surfactant effect of the salt-formed RAFT agent, an alkali metal such as sodium and potassium is preferable.

The acid group included in the RAFT agent of the step 1 is preferably one or more selected from $-CO_2H$, $-SO_3H$, and $-PO_4H$, and from the viewpoint that it is easy to form a salt and adjust the pH of the reaction solution, more preferably $-CO_2H$.

As preferred examples of the salt formed by the acid group of the RAFT agent represented by Formula (1) (hereinafter, may be also referred to as a salt of the RAFT agent (1)), the compounds represented by Formulae (1a) to (1n), described in the first aspect above as preferred examples, are exemplary examples.

As a particularly preferred salt of the RAFT agent (1) with respect to the ethylenically unsaturated monomer, for example, the compound represented by Formula (1-1) described above is an exemplary example. Furthermore, as a particularly preferred RAFT agent with respect to a methacrylic acid ester, the compound represented by Formula (1-2) described above is an exemplary example. The definition of M in the formulae is the same as described above.

As the above-described water-soluble inorganic base, for example, a hydroxide having a hydroxide ion as an anion is preferable. Specifically, sodium hydroxide, potassium hydroxide, and the like are exemplary examples. The water-soluble inorganic base is an inorganic base which is dissolved in 100 g of water at 20° C. in an amount of 1 g or more.

A mixing proportion of the RAFT agent and the water-soluble inorganic base in the step 1 is preferably a proportion at which the acid group included in the RAFT agent sufficiently forms the salt. Here, the number of moles of the acid group of the RAFT agent contained in the RAFT agent aqueous solution obtained in the step 1 is considered to be M1.

In a case where the RAFT agent blended in the step 1 has one acid group in the molecule, the number of moles M1 of the acid group of the above-described RAFT agent contained in the RAFT agent aqueous solution is the same as the number of moles of the molecule of the RAFT agent. In a case where the number of acid groups included in the molecule of the above-described RAFT agent is m, the number of moles M1 of the acid group of the RAFT agent contained in the RAFT agent aqueous solution is represented by the number of moles of molecules of the RAFT agent×m.

In the RAFT agent aqueous solution obtained in the step 1, a molar ratio represented by (M4/M1) of the number of moles M4 of the water-soluble inorganic base to the number of moles M1 of the acid group included in the RAFT agent is preferably 1.0 to 10, more preferably 1.5 to 7.0, still more preferably 2.0 to 5.0, particularly preferably 2.5 to 4.5, and most preferably 3.0 to 4.0.

In a case where the molar ratio is equal to or more than the lower limit value of the above-described range, the salt formation of the RAFT agent aqueous solution obtained in the step 1 sufficiently proceeds, the reaction time of the RAFT polymerization using the RAFT polymerization reaction solution obtained in the subsequent step 2 can be shortened, the yield of the target product is increased, the amount of the coagulated matter can be reduced, and the molecular weight distribution of the target product can be narrowed.

In a case where the molar ratio is equal to or less than the upper limit value of the above-described range, the salt of the RAFT agent aqueous solution obtained in the step 1 is stable, the pH of the RAFT polymerization reaction solution obtained in the subsequent step 2 is suppressed from being too high, and the volume-average particle diameter (MV) of the target product can be reduced.

The above-described RAFT agent blended in the step 1 may be one kind or may be two or more kinds. The above-described number of moles M1 is the total number of moles of acid groups of all RAFT agents.

The above-described water-soluble inorganic base blended in the step 1 may be one kind or may be two or more kinds. The above-described number of moles M4 is the total number of moles of all inorganic bases.

<Step 2>

The step 2 is a step of adding a water-soluble polymerization initiator (hereinafter, may be simply referred to as a polymerization initiator) and an ethylenically unsaturated monomer to the above-described RAFT agent aqueous solution and stirring the mixture to perform RAFT polymerization of the ethylenically unsaturated monomer dispersed in water and to obtain a RAFT polymerization reaction solution (A) in which a polymer-type RAFT agent represented by Formula (2) is dispersed in water.

Here, the water-soluble polymerization initiator refers to a polymerization initiator which can be dissolved in 100 g of water at 20° C. in an amount of 1 g or more.

As the polymerization initiator of the present step, a known radical polymerization initiator can be adopted. Specifically, as the polymerization initiator, inorganic peroxides such as potassium persulfate, sodium persulfate, ammonium persulfate, and hydrogen peroxide; organic peroxides such as benzoyl peroxide and isobutyryl peroxide; azo compounds such as azobisisobutyronitrile, 4-methoxy-azo-bisvaleronitrile, and 4,4'-azobis(4-cyanopentanoic acid); and redox-based initiators in which an organic peroxide is combined with ferrous sulfate, a chelating agent, and a reducing agent, for example, those consisting of cumene hydroperoxide, ferrous sulfate, sodium pyrophosphate, and dextrose, and those in which t-butyl hydroperoxide, sodium formaldehyde sulfoxylate (Rongalite), ferrous sulfate, and disodium ethylenediaminetetraacetate are combined are exemplary examples. Among these, from the viewpoint of enhancing the reactivity of the RAFT polymerization using the RAFT agent according to the present aspect, 4,4'-azobis(4-cyanopentanoic acid) is preferable.

The polymerization initiator used in the step 2 may or may not have an acid group. In a case where the polymerization initiator has an acid group, the acid group may form a salt or may not form a salt, but from the viewpoint of sufficiently obtaining the effects of the present invention, it is preferable that the salt is formed. As the acid group included in the polymerization initiator, one or more selected from $-CO_2H$, $-SO_3H$, and $-PO_4H$ are exemplary examples. Among these, from the viewpoint that it is easy to form a salt and adjust the pH of the reaction solution, $-CO_2H$ is preferable. In a case where the number of acid groups in the molecule of the polymerization initiator is n, the number of moles of the acid group of the polymerization initiator added in the present step is represented by the number of moles of molecules of the polymerization initiator×n.

In the step 2, as a method of adding the water-soluble polymerization initiator to the RAFT agent aqueous solution obtained in the step 1, the water-soluble polymerization initiator may be directly added to the RAFT agent aqueous solution, or an aqueous solution of the polymerization initiator, obtained by dissolving the water-soluble polymerization initiator in water, may be prepared first and then added to the RAFT agent aqueous solution. In a case where the water-soluble polymerization initiator has an acid group, from the viewpoint of sufficiently obtaining the effects of the present invention, it is preferable to prepare an aqueous solution of the polymerization initiator and add a water-soluble inorganic base to the aqueous solution to form a salt of the acid group of the water-soluble polymerization initiator.

The type of the water-soluble inorganic base which is optionally added in the step 2 may be the same as or different from the type of the water-soluble inorganic base which is added in the step 1.

In the above-described aqueous solution of the polymerization initiator, a molar ratio represented by (M5/M2) of the number of moles M5 of the water-soluble inorganic base optionally added in the step 2 to the number of moles M2 of the acid group in a case where the above-described polymerization initiator has an acid group is preferably 1.0 to 10, more preferably 1.5 to 7.0, still more preferably 2.0 to 5.0, particularly preferably 2.5 to 4.5, and most preferably 3.0 to 4.0.

In a case where the molar ratio is equal to or more than the lower limit value of the above-described range, the reaction time of the RAFT polymerization using the RAFT polymerization reaction solution obtained in the step 2 can be shortened, the yield of the target product can be increased, the amount of the coagulated matter can be reduced, and the molecular weight distribution of the target product can be narrowed.

In a case where the molar ratio is equal to or less than the upper limit value of the above-described range, it is possible to suppress the pH of the RAFT polymerization reaction solution obtained in the step 2 from being too high and to reduce the volume-average particle diameter (MV) of the target product.

In a reaction solution after adding the ethylenically unsaturated monomer and the water-soluble polymerization initiator to the above-described RAFT agent aqueous solution and immediately before starting polymerization, a molar ratio represented by (M4+M5)/(M1+M2) is preferably 1.0 to 10, more preferably 1.5 to 7.0, still more preferably 2.0 to 5.0, particularly preferably 2.5 to 4.5, and most preferably 3.0 to 4.0, in which the number of moles of the acid group included in the RAFT agent is indicated as M1, the number of moles of the acid group which may be included in the water-soluble polymerization initiator is indicated as M2, the number of moles of the water-soluble inorganic base added in the above-described step 1 is indicated as M4, and the number of moles of the water-soluble inorganic base which may be added in the step 2 is indicated as M5.

In a case where the molar ratio is equal to or more than the lower limit value of the above-described range, the reaction time of the RAFT polymerization using the RAFT polymerization reaction solution obtained in the step 2 can be shortened, the yield of the target product can be increased, the amount of the coagulated matter can be reduced, and the molecular weight distribution of the target product can be narrowed.

In a case where the molar ratio is equal to or less than the upper limit value of the above-described range, it is possible to suppress the pH of the RAFT polymerization reaction solution obtained in the step 2 from being too high and to reduce the volume-average particle diameter (MV) of the target product.

The above-described polymerization initiator blended in the step 2 may be one kind or may be two or more kinds. The above-described number of moles M2 is the total number of moles of acid groups of all polymerization initiators.

The above-described water-soluble inorganic base blended in the step 2 may be one kind or may be two or more kinds. The above-described number of moles M4 and M5 are the total number of moles of all inorganic bases blended in each step.

In the RAFT polymerization reaction solution obtained in the step 2, a molar ratio represented by {M3/(M1+M2)} of the total number of moles M3 (which can be M4+M5) of the water-soluble inorganic bases added in the step 1 and the step 2 to the number of moles M1 of the acid group of the above-described RAFT agent forming a salt and the number of moles M2 of the acid group of the above-described polymerization initiator forming a salt is 1.0 to 10, preferably 1.5 to 7.0, more preferably 2.0 to 5.0, still more preferably 2.5 to 4.5, and particularly preferably 3.0 to 4.0.

In a case where the molar ratio is equal to or more than the lower limit value of the above-described range, the reaction time of the RAFT polymerization using the RAFT polymerization reaction solution can be shortened, the yield of the target product can be increased, the amount of the coagulated matter can be reduced, and the molecular weight distribution of the target product can be narrowed.

In a case where the molar ratio is equal to or less than the upper limit value of the above-described range, it is possible to suppress the pH of the RAFT polymerization reaction solution from being too high and to reduce the volume-average particle diameter (MV) of the target product obtained using the RAFT polymerization reaction solution.

In the step 2, the amount of the above-described RAFT agent in the mixed solution at the stage of completion of blending the other components other than the polymerizable monomer is, for example, preferably 0.001% to 0.50% by mass, more preferably 0.01% to 0.20% by mass, and still more preferably 0.03% to 0.10% by mass with respect to the total mass of the mixed solution. In a case of being within the above-described suitable range, the monomer in the reaction solution can be sufficiently subjected to the RAFT polymerization in the step 2, and a polymer having a narrow molecular weight distribution can be obtained with a short reaction time. The amount of the coagulated matter remaining in the reaction solution after the reaction can be reduced.

In the step 2, the amount of the above-described polymerization initiator in the mixed solution at the stage of completion of blending the other components other than the polymerizable monomer is, for example, preferably 0.001% to 0.50% by mass, more preferably 0.01% to 0.20% by mass, and still more preferably 0.03% to 0.10% by mass with respect to the total mass of the mixed solution. In a case of being within the above-described suitable range, the monomer in the reaction solution can be sufficiently subjected to the RAFT polymerization in the step 2, and a polymer having a narrow molecular weight distribution can be obtained with a short reaction time. The amount of the coagulated matter remaining in the reaction solution after the reaction can be reduced.

In the step 2, the amount of water in the mixed solution at the stage of completion of blending the other components other than the polymerizable monomer is, for example, preferably 80% by mass or more, more preferably 90% by mass or more, and still more preferably 95% by mass or more with respect to the total mass of the mixed solution. As a guideline for the upper limit value, for example, 99% by mass or less is an exemplary example. In a case of being within the above-described suitable range, the RAFT polymerization in the step 2 can be easily initiated by adding the monomer to the reaction solution.

In the step 2, the reaction solution in which the ethylenically unsaturated monomer is subjected to the RAFT polymerization may contain a dispersion medium other than water and other additives to the extent that the RAFT polymerization is not inhibited, but it is preferable that the RAFT polymerization reaction solution does not contain the dispersion medium and the additives. As the dispersion medium other than water, an organic solvent miscible with water (for example, alcohol) is an exemplary example. As the other additives, a surfactant and the like are exemplary examples.

Since the acid group included in the RAFT agent of the step 2 forms a salt, the reactivity of the monomer is favorable. Therefore, the RAFT polymerization can be satisfactorily performed without using a surfactant.

In the step 2, by adding a polymerizable monomer and performing the RAFT polymerization, a living radical polymerization reaction occurs due to the action of the RAFT agent, and a polymer having a narrow molecular weight distribution (Mw/Mn) can be obtained with a short reaction time. The amount of residue (coagulated matter) remaining in the reaction solution after the reaction as an impurity can be reduced.

The above-described monomer is preferably a monomer capable of radical polymerization, and is more preferably an ethylenically unsaturated monomer from the viewpoint of favorable reactivity. As the ethylenically unsaturated monomer, the monomer represented by Formula (10) described above is an exemplary example.

The amount of the above-described monomer blended in the step 2 is, for example, preferably 1 to 100 parts by mass, more preferably 5 to 50 parts by mass, and still more preferably 10 to 25 parts by mass with respect to 1 part by mass of the above-described RAFT agent blended in the step 1. In a case of being within the above-described suitable range, the above-described effects can be further obtained.

In the step 2, the amount of water with respect to the total mass of the reaction solution after the addition of the above-described monomer is, for example, preferably 50% by mass or more and more preferably 60% by mass or more.

From the viewpoint of increasing the monomer reaction rate in the RAFT polymerization in the above-described reaction solution, reducing the volume-average particle diameter of a polymer (polymer-type RAFT agent) obtained by the RAFT polymerization, reducing the amount of the coagulated matter, and shortening the reaction time, the content of water is preferably as high as possible, for example, 80% by mass or more is preferable, 90% by mass or more is more preferable, 95% by mass or more is still more preferable, and 98% by mass or more is particularly preferable. As a guideline for the upper limit value in this case, for example, 99.5% by mass or less is an exemplary example.

Conversely, from the viewpoint of increasing the volume-average particle diameter of the polymer (polymer-type RAFT agent) obtained by the RAFT polymerization in the above-described reaction solution, the content of water is preferably as small as possible, for example, 97% by mass or less, more preferably 92% by mass or less, still more preferably 85% by mass or less, and particularly preferably 75% by mass or less. As a guideline for the lower limit value in this case, for example, 50% by mass is an exemplary example.

In the step 2, the reaction temperature of the above-described monomer is, for example, preferably 60° C. to 100° C. and more preferably 70° C. to 90° C. The reaction time until the completion of the RAFT reaction at these suitable reaction temperatures is approximately 200 to 1,500 minutes.

In the step 2, other reaction conditions in the RAFT reaction of the above-described monomer are appropriately set with reference to the RAFT polymerization in the related art.

Further detailed examples of the RAFT polymerization of the above-described monomer in the step 2 are shown in Examples 1a to 19a and the like described later.

By the RAFT polymerization in the step 2, a RAFT polymerization reaction solution (A) containing a polymer-type RAFT agent described below is obtained.

<RAFT Polymerization Reaction Solution (A)>

The RAFT polymerization reaction solution (A) is a solution of a polymer-type RAFT agent represented by Formula (2) dispersed in water. At least a part of the acid group of the above-described polymer-type RAFT agent forms a salt with a cation component of the water-soluble inorganic base used in the above-described production steps.

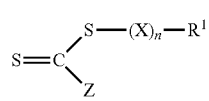

[in Formula (2), $R^1$ represents an organic group, the organic group has one or more acid groups selected from $-CO_2H$, $-SO_3H$, and $-PO_4H$, Z represents an organic group selected from an alkyl group, an aryl group, an arylalkyl group, an alkylthio group, an arylthio group, and an arylalkylthio group, a part of the organic group represented by Z may be substituted, X represents a repeating unit of any ethylenically unsaturated monomer, n represents an integer of 1 to 1,000 (from the viewpoint of reducing the amount of coagulated matter, 1 to 200 is preferable and 1 to 100 is more preferable), and in a case where n is 2 or more, a plurality of X's may be the same or different from each other]

Since the descriptions of $R^1$ and Z in Formula (2) are the same as the descriptions of $R^1$ and Z in Formula (1) of the first aspect, the same descriptions will not be repeated here.

As the any ethylenically unsaturated monomer represented by X, the above-described examples are exemplary examples. Among these, since the RAFT polymerization using a polymer-type RAFT agent is facilitated, styrene, acrylonitrile, butyl acrylate, or (meth)acrylic acid is preferable. These may be used alone or a combination of two or more kinds thereof may be used.

In a case where X to which $R^1$ is bonded is an ethylenically unsaturated monomer and $R^1$ derived from the RAFT agent is an organic group having a carbon atom A bonded to X, the carbon atom A of the organic group is preferably tertiary. In a case where the carbon atom is tertiary, a substituent substituted to a hydrogen atom of the carbon atom A is preferably a linear or branched alkyl group having 1 to 6 carbon atoms, and more preferably a linear alkyl group having 1 to 3 carbon atoms. In these suitable cases, the subsequent RAFT polymerization using the polymer-type RAFT agent is facilitated.

In a case where X to which $R^1$ is bonded is a methacrylic acid ester and $R^1$ derived from the RAFT agent is an organic group having a carbon atom B bonded to X, the carbon atom B of the organic group is preferably quaternary. In a case where the carbon atom is quaternary, two substituents substituted to a hydrogen atom of the carbon atom B are each independently preferably a linear or branched alkyl group having 1 to 6 carbon atoms, and more preferably a linear alkyl group having 1 to 3 carbon atoms. Furthermore, it is preferable that at least one hydrogen atom of the alkyl group constituting the above-described substituent is substituted with a cyano group. As a preferred example thereof, an example in which the above-described carbon atom B is a quaternary carbon atom in which an alkyl group having 1 to 3 carbon atoms and a cyano group are bonded is an exemplary example. In these suitable cases, the subsequent RAFT polymerization using the polymer-type RAFT agent is facilitated.

It is preferable that the acid group which has formed the above-described salt is bonded to the above-described carbon atom A or the above-described carbon atom B directly or through a linking group. As the above-described linking group, a linear or branched alkylene group having 1 to 6 carbon atoms is an exemplary example. Any methylene group constituting the above-described alkylene group may be substituted with $-O-$, $-C(=O)O-$, $-OC(=O)-$, or —C(=O)NH— (provided that a case where oxygen atoms are bonded to each other is excluded).

The number of repeating units represented by n is preferably 5 or more, more preferably 10 or more, still more preferably 20 or more, particularly preferably 30 or more, and most preferably 40 or more. Here, the number of repeating units is the number of repeating units in the total of one or more kinds of monomers corresponding to X.

In a case where n is equal to or more than the above-described lower limit value, the polymerized moiety $(X)_n$ can exhibit a function as a block of the polymer.

The above-described polymer-type RAFT agent can form particles in the RAFT polymerization reaction solution. The volume-average particle diameter thereof is preferably 5 to 500 nm, more preferably 7 to 100 nm, and still more preferably 10 to 50 nm. In a case of being within the above-described suitable range, dispersibility of the polymer-type RAFT agent in water is enhanced, and the reaction time can be shortened, which is advantageous.

The volume-average particle diameter (MV) of the polymer-type RAFT agent contained in the RAFT polymerization reaction solution (A) is obtained from an average particle diameter (volume-average particle diameter), which is calculated from a particle size distribution of the polymer in a latex, which is measured by a dynamic light scattering method (solvent: water, temperature: 25° C.) using Nanotrac UPA-EX150 manufactured by Nikkiso Co., Ltd.

A molecular weight distribution of the above-described polymer-type RAFT agent, represented by Mw/Mn, is preferably as narrow as possible, and is preferably 2.0 or less, more preferably 1.8 or less, still more preferably 1.6 or less, particularly preferably 1.4 or less, and most preferably 1.2 or less. Usually, the lower limit value of the molecular weight distribution is 1.0 or more.

The molecular weight distribution of the polymer-type RAFT agent contained in the RAFT polymerization reaction solution (A) can be obtained by coagulating a latex at 60° C. to 95° C. using calcium chloride as a coagulating agent, dewatering, washing, and drying the latex, dissolving the latex in tetrahydrofuran, and then obtaining Mw and Mn by GPC in terms of standard polystyrene.

The pH of the RAFT polymerization reaction solution (A) is preferably 8 to 13, more preferably 9 to 13, still more preferably 10 to 13, particularly preferably 11 to 13, and most preferably 12 to 13.

In a case of being within the above-described suitable range, the molecular weight distribution of the polymer formed by the RAFT polymerization using the RAFT polymerization reaction solution (A) can be further narrowed.

The pH is a value measured at 25° C. by a method specified in JiS Z 8802:2011. In the present specification, the pH is represented by an integer, and is valid up to the first decimal place. That is, the first decimal place of the measured value is a value rounded off.

The amount of the above-described polymer-type RAFT agent before use of the RAFT polymerization reaction solution (A), that is, before the addition of the polymerizable monomer is, for example, preferably 0.01% to 10.0% by mass, more preferably 0.1% to 5.0% by mass, and still more preferably 0.5% to 3.0% by mass with respect to the total mass of the RAFT polymerization reaction solution (A) before use. In a case of being within the above-described suitable range, the monomer in the reaction solution can be sufficiently subjected to the RAFT polymerization, and a polymer having a narrow molecular weight distribution can be obtained with a short reaction time. The amount of the coagulated matter remaining in the reaction solution after the reaction can be reduced.

The above-described polymer-type RAFT agent contained in the RAFT polymerization reaction solution (A) may be one kind or may be two or more kinds.

The amount of water before use of the RAFT polymerization reaction solution (A), that is, before the addition of the polymerizable monomer is, for example, preferably 80% by mass or more, more preferably 90% by mass or more, and still more preferably 95% by mass or more with respect to the total mass of the RAFT polymerization reaction solution (A) before use. As a guideline for the upper limit value, for example, 99% by mass or less is an exemplary example. In a case of being within the above-described suitable range, the RAFT polymerization can be easily initiated by adding the monomer to the reaction solution.

The RAFT polymerization reaction solution (A) may contain a dispersion medium other than water and other additives to the extent that the RAFT polymerization is not inhibited, but it is preferable that the RAFT polymerization reaction solution does not contain the dispersion medium and the additives. As the dispersion medium other than water, an organic solvent miscible with water (for example, alcohol) is an exemplary example. As the other additives, a surfactant and the like are exemplary examples.

Since the acid group included in the polymer-type RAFT agent in the RAFT polymerization reaction solution (A) forms a salt, the reactivity of the monomer is favorable. Therefore, the RAFT polymerization can be satisfactorily performed without using a surfactant.

<Step 3>

In the present invention, a step 3 may be further performed after the step 2.

The step 3 is a step of adding an ethylenically unsaturated monomer to the RAFT polymerization reaction solution (A) obtained in the step 2 and stirring the mixture to perform RAFT polymerization of the ethylenically unsaturated monomer dispersed in water and to obtain a RAFT polymerization reaction solution (B) in which a hydrophilic copolymer-type RAFT agent represented by Formula (3) is dispersed in water.

In the step 3, by adding one or more polymerizable monomers to the RAFT polymerization reaction solution (A) and performing the RAFT polymerization, a living radical polymerization reaction occurs due to the action of the polymer-type RAFT agent, and a polymer having a narrow molecular weight distribution can be obtained with a short reaction time. The amount of residue (coagulated matter) remaining in the reaction solution after the reaction as an impurity can be reduced.

As the above-described monomer, the monomers described in the step 2 are exemplary examples. By using a monomer of a different kind or a different formulation from the ethylenically unsaturated monomer represented by X, which constitutes the above-described polymer-type RAFT agent, a diblock copolymer including a block different from the block represented by (X) in Formula (2) is obtained.

The amount of the above-described monomer to be added to the RAFT polymerization reaction solution (A) is, for example, preferably 1 to 90 parts by mass, more preferably 5 to 60 parts by mass, and still more preferably 9 to 30 parts by mass with respect to 1 part by mass of the above-described polymer-type RAFT agent contained in the reaction solution. In a case of being within the above-described suitable range, the molecular weight distribution of the generated polymer is further narrowed.

In the step 3, a polymerization initiator may be added to the RAFT polymerization reaction solution (A). The amount of the polymerization initiator to be added can be, for example, 0.01% to 0.1% by mass with respect to the total mass of the RAFT polymerization reaction solution (A) before the addition of the polymerizable monomer. It is preferable to appropriately set the above-described amount to be equimolar with the amount of the polymer-type RAFT agent, and for example, from the viewpoint of achieving stable RAFT polymerization, it is preferable to add the polymerization initiator in an amount of appropriately 1 to 5 parts by mass with respect to 100 parts by mass of the polymer-type RAFT agent.

As the polymerization initiator to be added, the polymerization initiators described in the step 2 are exemplary examples. The polymerization initiator to be added to the RAFT polymerization reaction solution (A) may be one kind or two or more kinds.

The reaction temperature in the RAFT reaction using the RAFT polymerization reaction solution (A) is, for example, preferably 60° C. to 100° C. and more preferably 70° C. to 90° C. The reaction time until the completion of the RAFT reaction at these suitable reaction temperatures is approximately 60 to 600 minutes.

Other reaction conditions in the RAFT reaction using the RAFT polymerization reaction solution (A) are appropriately set with reference to the RAFT polymerization in the related art.

Further detailed examples of the RAFT polymerization using the RAFT polymerization reaction solution (A) are shown in Examples 1b to 19b and the like described later.

A hydrophilic copolymer-type RAFT agent described below is obtained by the RAFT polymerization using the RAFT polymerization reaction solution in the step 3.

<RAFT Polymerization Reaction Solution (B)>

The RAFT polymerization reaction solution (B) is a solution of a hydrophilic copolymer-type RAFT agent represented by Formula (3) dispersed in water. At least a part of an acid group included in the above-described hydrophilic copolymer-type RAFT agent forms a salt with a cation component of the water-soluble inorganic base.

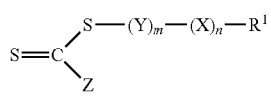

(3)

[in Formula (3), $R^1$ represents an organic group, the organic group has one or more acid groups selected from $-CO_2H$, $-SO_3H$, and $-PO_4H$, Z represents an organic group selected from an alkyl group, an aryl group, an arylalkyl group, an alkylthio group, an arylthio group, and an arylalkylthio group, a part of the organic group represented by Z may be substituted, X represents a repeating unit of any ethylenically unsaturated monomer, n represents an integer of 1 to 100, in a case where n is 2 or more, a plurality of X's may be the same or different from each other, Y represents a repeating unit of any ethylenically unsaturated monomer, m represents an integer of 10 to 10,000, a plurality of Y's may be the same or different from each other, and a polymer chain represented by $(X)_n$ is different from a polymer chain represented by $(Y)_m$]

Since the descriptions of $R^1$ and Z in Formula (3) are the same as the descriptions of $R^1$ and Z in Formula (1), the same descriptions will not be repeated here.

Since the descriptions of X and n in Formula (3) are the same as the descriptions of X and n in Formula (2), the same descriptions will not be repeated here.

As the any ethylenically unsaturated monomer represented by Y, the above-described examples are exemplary examples. Among these, since the RAFT polymerization using a hydrophilic copolymer-type RAFT agent is facilitated, styrene, acrylonitrile, butyl acrylate, or (meth)acrylic acid is preferable.

These may be used alone or a combination of two or more kinds thereof may be used.

The number of repeating units represented by m is preferably 50 or more, more preferably 100 or more, still more preferably 200 or more, particularly preferably 300 or more, and most preferably 400 or more. Here, the number of repeating units is the number of repeating units in the total of one or more kinds of monomers corresponding to Y.

In a case where m is equal to or more than the above-described lower limit value, the polymerized moiety $(Y)_m$ can exhibit a function as a block of the polymer.

The above-described hydrophilic copolymer-type RAFT agent can form particles in the RAFT polymerization reaction solution. The volume-average particle diameter thereof is preferably 10 to 500 nm, more preferably 15 to 300 nm, and still more preferably 20 to 200 nm. In a case of being within the above-described suitable range, dispersibility of the hydrophilic copolymer-type RAFT agent in water is enhanced, and the reaction time can be shortened, which is advantageous.

The volume-average particle diameter (MV) of the hydrophilic copolymer-type RAFT agent contained in the RAFT polymerization reaction solution according to the present aspect is obtained from an average particle diameter (volume-average particle diameter), which is calculated from a particle size distribution of the polymer in a latex, which is measured by a dynamic light scattering method (solvent: water, temperature: 25° C.) using Nanotrac UPA-EX150 manufactured by Nikkiso Co., Ltd.

A molecular weight distribution of the above-described hydrophilic copolymer-type RAFT agent, represented by Mw/Mn, is preferably as narrow as possible, and is preferably 3.0 or less, more preferably 2.5 or less, still more preferably 2.0 or less, particularly preferably 1.8 or less, and most preferably 1.6 or less. Usually, the lower limit value of the molecular weight distribution is 1.0 or more.

The molecular weight distribution of the hydrophilic copolymer-type RAFT agent contained in the RAFT polymerization reaction solution (B) can be obtained by coagulating a latex at 60° C. to 95° C. using calcium chloride as a coagulating agent, dewatering, washing, and drying the latex, dissolving the latex in tetrahydrofuran, and then obtaining Mw and Mn by GPC in terms of standard polystyrene.

The pH of the RAFT polymerization reaction solution (B) is preferably 8 to 13 and more preferably 7 to 13. In this range, dispersibility of the hydrophilic copolymer-type RAFT agent in the RAFT polymerization reaction solution is further improved. The method of measuring the pH is as described above.

The amount of the above-described hydrophilic copolymer-type RAFT agent before use of the RAFT polymerization reaction solution (B), that is, before the addition of the polymerizable monomer is, for example, preferably 0.1% to 20.0% by mass, more preferably 1.0% to 15.0% by mass, and still more preferably 5.0% to 10.0% by mass with respect to the total mass of the RAFT polymerization reaction solution (B) before use. In a case of being within the above-described suitable range, the monomer in the reaction solution can be sufficiently subjected to the RAFT polymerization, and a polymer having a narrow molecular weight distribution can be obtained with a short reaction time. The amount of the coagulated matter remaining in the reaction solution after the reaction can be reduced.

The above-described hydrophilic copolymer-type RAFT agent contained in the RAFT polymerization reaction solution (B) may be one kind or may be two or more kinds.

The amount of water before use of the RAFT polymerization reaction solution (B), that is, before the addition of the polymerizable monomer is, for example, preferably 60% by mass or more, more preferably 70% by mass or more, and still more preferably 80% by mass or more with respect to the total mass of the RAFT polymerization reaction solution before use. As a guideline for the upper limit value, for example, 99% by mass or less is an exemplary example. In a case of being within the above-described suitable range, the RAFT polymerization can be easily initiated by adding the monomer to the reaction solution.

The RAFT polymerization reaction solution (B) may contain a dispersion medium other than water and other additives to the extent that the RAFT polymerization is not inhibited, or may not contain the dispersion medium and the additives. As the dispersion medium other than water, an organic solvent miscible with water (for example, alcohol) is an exemplary example. As the other additives, a surfactant and the like are exemplary examples.

Since the acid group included in the hydrophilic copolymer-type RAFT agent in the RAFT polymerization reaction solution (B) forms a salt, the reactivity of the monomer is favorable. Therefore, the RAFT polymerization can be satisfactorily performed without using a surfactant.

<Use of RAFT Polymerization Reaction Solution (B)>

By adding one or more polymerizable monomers to the RAFT polymerization reaction solution (B) and performing the RAFT polymerization, a living radical polymerization reaction occurs due to the action of the hydrophilic copolymer-type RAFT agent, and a polymer having a narrow molecular weight distribution can be obtained with a short reaction time. The amount of residue (coagulated matter) remaining in the reaction solution after the reaction as an impurity can be reduced.

As the above-described monomer, the monomers described in the step 2 are exemplary examples. By using a monomer of a different kind or a different formulation from the ethylenically unsaturated monomers represented by X and Y, which constitute the above-described hydrophilic copolymer-type RAFT agent, a triblock copolymer including a block different from the block represented by $(X)_n$ and the block represented by $(Y)_m$ in Formula (3) is obtained. Similarly, any multi-stage block copolymer solution can be obtained by further polymerizing a monomer using the obtained polymer solution as a RAFT polymerization reaction solution.

The amount of the above-described monomer to be added to the RAFT polymerization reaction solution (B) is, for example, preferably 1 to 90 parts by mass, more preferably 3 to 60 parts by mass, and still more preferably 6 to 30 parts by mass with respect to 1 part by mass of the above-described hydrophilic copolymer-type RAFT agent contained in the reaction solution. In a case of being within the above-described suitable range, the molecular weight distribution of the generated polymer is further narrowed.

A polymerization initiator may be added at the time of using the RAFT polymerization reaction solution (B). The amount of the polymerization initiator to be added can be, for example, 0.01% to 0.1% by mass with respect to the total mass of the RAFT polymerization reaction solution (B) before the addition of the polymerizable monomer. The amount thereof can be appropriately set according to the amount of the hydrophilic copolymer-type RAFT agent.

The polymerization initiator to be added to the RAFT polymerization reaction solution (B) may be one kind or two or more kinds.

The reaction temperature in the RAFT reaction using the RAFT polymerization reaction solution (B) is, for example, preferably 60° C. to 100° C. and more preferably 70° C. to 90° C. The reaction time until the completion of the RAFT reaction at these suitable reaction temperatures is approximately 60 to 600 minutes.

Other reaction conditions in the RAFT reaction using the RAFT polymerization reaction solution (B) are appropriately set with reference to the RAFT polymerization in the related art.

Further detailed examples of the RAFT polymerization using the RAFT polymerization reaction solution (B) are shown in Examples 1c to 19c and the like described later.

<<Thermoplastic Resin Composition>>

The polymer obtained by the above-described RAFT polymerization using the RAFT polymerization reaction solution obtained by the production method according to the present aspect can be a thermoplastic resin reflecting characteristics of each block constituting the polymer. Other optional components can be added to the thermoplastic resin as necessary to obtain a thermoplastic resin composition. Descriptions regarding the thermoplastic resin composition are as described above.

EXAMPLES

<Experimental System Focusing on Particle Diameter>

Example 1a 138 parts by mass of water was put into a container equipped with a stirrer, a thermometer, a nitrogen gas introduction tube, a dropping funnel, and a reflux condenser; 3.3 parts by mass of potassium hydroxide was dissolved therein; 6 parts by mass of 2-[(dodecylsulfanylthiocarbonyl)sulfanyl]propanoic acid (manufactured by BRON MOLECULAR, model number: BM1430) was added thereto; and after nitrogen replacement, the mixture was stirred at 60° C. for 1 hour while maintaining the temperature. As a result, a saponified aqueous solution of a RAFT agent (Formula Q below), obtained by treating the carboxy group of BM1430 with potassium hydroxide, was obtained. In the reaction solution, a molar ratio (base/acid group) of potassium hydroxide as a base to BM1430 as an acid was 3.4. Here, since BM1430 had one carboxy group in the molecule, the number of moles of the acid group in a case of obtaining the above-described molar ratio is equal to the number of moles of BM1430.

200 parts by mass of water was put into a container equipped with a stirrer, a thermometer, a nitrogen gas introduction tube, a dropping funnel, and a reflux condenser; 6.7 parts by mass of potassium hydroxide was dissolved therein; 5 parts by mass of 4,4'-azobis(4-cyanopentanoic acid) (manufactured by FUJIFILM Wako Pure Chemical Corporation, model number: V-501) was added thereto; and after nitrogen replacement, the mixture was stirred at room temperature for 60 minutes. As a result, an initiator aqueous solution obtained by treating a carboxy group of V-501 with potassium hydroxide was obtained. In the reaction solution, a molar ratio (base/acid group) of potassium hydroxide as a base to V-501 as an acid was the same value of 3.4 as that of the saponified RAFT agent aqueous solution. Here, since V-501 had two carboxy groups in the molecule, the number of moles of the acid group in a case of obtaining the above-described molar ratio is twice the number of moles of V-501.

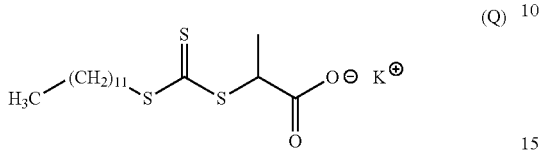
(Q)

Next, 9662 parts by mass of water was put into a reaction container equipped with a stirrer, a thermometer, a nitrogen gas introduction tube, a dropping funnel, and a reflux condenser; 147.3 parts by mass of the above-described saponified RAFT agent aqueous solution, 211.7 parts by mass of the above-described initiator aqueous solution, and 100 parts by mass of styrene (ST) were added thereto; and the mixture was nitrogen-replaced and stirred. The mass of the solute (solution concentration) with respect to the total mass of the reaction solution immediately before the start of the reaction was 1.20% by mass. Thereafter, the mixture was stirred while being heated to 80° C., and sampling was performed at intervals of 30 minutes. The reaction was regarded as completed when the change in solid content (non-volatile component) was eliminated. As a result, the reaction was performed for 300 minutes, and a RAFT polymerization reaction solution (A) in which a polymer-type RAFT agent represented by Formula X was dispersed in water was obtained.

At the time when the reaction was completed, the total solid content contained in the reaction solution was 1.18% by mass, and the monomer reaction rate was 98.4%. Here, the total solid content is the total solid content contained in the total mass of the reaction solution. The monomer reaction rate is a value calculated by [(Total solid content−Amount of RAFT agent charged−Amount of polymerization initiator charged−Amount of potassium hydroxide charged) ÷Amount of ST monomer charged]×100(%).

In the above-described reaction solution, the volume-average particle diameter (MV) of the polymer-type RAFT agent represented by Formula X was 10 nm. In each of Examples, the volume-average particle diameter (MV) was obtained from an average particle diameter (volume-average particle diameter), which is calculated from a particle size distribution of the polymer in a latex, which was measured by a dynamic light scattering method (solvent: water, temperature: 25° C.) using Nanotrac UPA-EX150 manufactured by Nikkiso Co., Ltd. The pH of the reaction solution was 11.

The amount of the coagulated matter (reaction residue) coagulated on an inner wall surface of the reaction container was 0.1 parts by mass with respect to the styrene monomer used.

In a case where the above-described polymer-type RAFT agent was analyzed by GPC, the number-average molecular weight (Mn) was 5,800 in terms of standard polystyrene, and a molecular weight distribution (Mw/Mn) was 1.1.

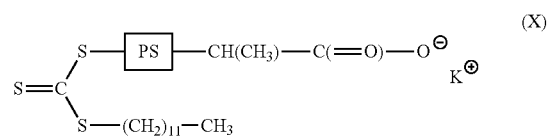
(X)

Example 1b 75 parts by mass of water was put into a reaction container equipped with a stirrer, a thermometer, a nitrogen gas introduction tube, a dropping funnel, and a reflux condenser; 424 parts by mass (5 parts by mass as solid content) of a RAFT polymerization reaction solution (A) containing the polymer-type RAFT agent having a pH of 11, which was obtained in Example 1a, was added thereto; and the mixture was nitrogen-replaced and stirred. Thereafter, while raising the temperature to 80° C., 0.1 parts by mass of V-501 as a polymerization initiator was added thereto; a mixed solution of 32.5 parts by mass of styrene and 12.5 parts by mass of acrylonitrile (AN) was added dropwise into the reaction container over 60 minutes; and after the dropwise addition was completed, the mixture was further stirred for 30 minutes.

It was confirmed that the monomer reaction rate at this time point was 95%. Here, the monomer reaction rate is a value calculated by [(Total solid content−Amount of polymer-type RAFT agent charged−Amount of polymerization initiator charged−Amount of potassium hydroxide charged) ÷Amount of monomer charged]×100(%). Since the monomer reaction rate was 90% or more, the reaction was completed by setting the reaction time to 90 minutes. As a result, a RAFT polymerization reaction solution (B) in which a block copolymer 1 (hydrophilic copolymer-type RAFT agent) represented by Formula Y was dispersed in water was obtained.

In the test examples to be described later, when the change in solid content (non-volatile component content) in the reaction solution was confirmed, in a case where the monomer reaction rate was not more than 90%, the stirring was extended until the monomer reaction rate exceeded 90% or the change in solid content was settled, and then the reaction was completed.

The volume-average particle diameter (MV) of the block copolymer 1 represented by Formula Y was 20 nm. The pH of the reaction solution was 11, and the total solid content thereof was 8.8% by mass.

Furthermore, in a case where the block copolymer 1 was analyzed by GPC, the number-average molecular weight (Mn) was 58,000 in terms of standard polystyrene, and a molecular weight distribution (Mw/Mn) was 1.5.

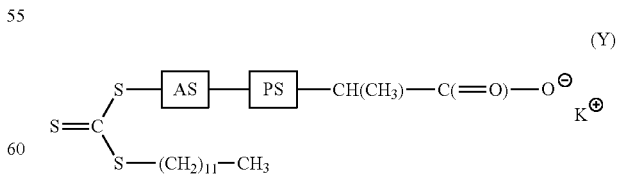
(Y)

Example 1c 50 parts by mass of butyl acrylate (BA) was added dropwise to 544.1 parts by mass of the RAFT polymerization reaction solution (B) containing the block copolymer 1 obtained in Example 1b over 30 minutes while heating the solution to 80° C., and the mixture was further stirred for 60 minutes.

The monomer reaction rate at this time was confirmed. Here, the monomer reaction rate is a value calculated by [(Total solid content−Amount of block copolymer 1 charged−Amount of polymerization initiator charged−Amount of potassium hydroxide charged)÷Amount of monomer charged]×100(%). Since the monomer reaction rate was 90% or more, the reaction was completed by setting the reaction time to 90 minutes. As a result, a dispersion in which a block copolymer 2 represented by Formula Z was dispersed in water was obtained.

In the test examples to be described later, when the change in solid content (non-volatile component content) in the reaction solution was confirmed, in a case where the monomer reaction rate was not more than 90%, the stirring was extended until the monomer reaction rate exceeded 90% or the change in solid content was settled, and then the reaction was completed.

In the above-described reaction solution, the volume-average particle diameter (MV) of the block copolymer 2 represented by Formula Z was 30 nm. The pH of the reaction solution was 8, the total solid content was 16.2% by mass, and the monomer reaction rate in the step of Example 1c was 96.8%. The amount of the coagulated matter (reaction residue) coagulated on an inner wall surface of the reaction container was 0.1 parts by mass with respect to the butyl acrylate monomer used.

In a case where the above-described block copolymer 2 was analyzed by GPC, the number-average molecular weight (Mn) was 116,000 in terms of standard polystyrene, and a molecular weight distribution (Mw/Mn) was 1.8.

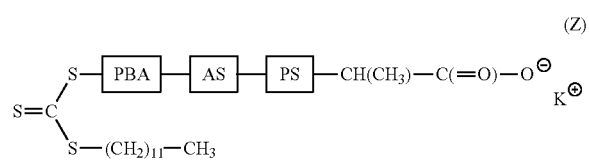

(Z)

Examples 2a to 6a, and Examples R1a and R2a

As shown in Table 1, a RAFT polymerization reaction solution (A) containing the polymer-type RAFT agent represented by Formula X described above was obtained in the same manner as in Example 1a, except that a concentration of each component in the reaction solution immediately before the start of the reaction was changed. The results of measuring the volume-average particle diameter (MV) and the like of the obtained polymer-type RAFT agent are shown in Table 1. The concentration of each component in the reaction solution was adjusted by increasing or decreasing the amount of water in the reaction solution.

TABLE 1

| | Example | | | | | | | |
|---|---|---|---|---|---|---|---|---|
| | R1a | 1a | 2a | 3a | 4a | 5a | 6a | R2a |
| Solution concentration before start of reaction (% by mass) | 0.40 | 1.20 | 2.51 | 4.90 | 10.80 | 19.5 | 32.6 | 49.2 |
| ST (part by mass) | 100 | 100 | 100 | 100 | 100 | 100 | 100 | 100 |
| V-501 (part by mass) | 5 | 5 | 5 | 5 | 5 | 5 | 5 | 5 |
| BM1430 (part by mass) | 6 | 6 | 6 | 6 | 6 | 6 | 6 | 6 |
| M3/(M1 + M2) (molar ratio) | 3.4 | 3.4 | 3.4 | 3.4 | 3.4 | 3.4 | 3.4 | 3.4 |
| TSC at end of reaction (% by mass) | 0.39 | 1.18 | 2.47 | 4.80 | 10.5 | 18.5 | 30.5 | 45.3 |
| Monomer reaction rate (%) | 96.5 | 98.4 | 98.1 | 97.6 | 96.7 | 93.9 | 92.2 | 90.4 |
| MV (nm) | 4 | 10 | 15 | 30 | 50 | 90 | 200 | 600 |
| pH at end of reaction | 10 | 11 | 12 | 12 | 12 | 12 | 13 | 13 |
| Mn | 5800 | 5800 | 5800 | 5800 | 5800 | 5800 | 5900 | 6100 |
| Mw/Mn | 1.1 | 1.1 | 1.1 | 1.1 | 1.1 | 1.3 | 1.5 | 1.9 |
| Reaction time (min) | 270 | 300 | 320 | 360 | 420 | 540 | 600 | 1000 |
| Amount of coagulated matter (part by mass) | 0.1 | 0.1 | 0.1 | 0.1 | 0.1 | 0.3 | 1 | 3 |

In Example R1a, the volume-average particle diameter (MV) was small, and in Example R2a, the reaction time was long, the amount of coagulated matter was large, and the molecular weight distribution was broad. From the viewpoint of increasing productivity, it was preferable that the volume-average particle diameter (MV) was a certain value or more, and it was preferable to react the components with a shorter reaction time to reduce the amount of coagulated matter and narrow the molecular weight distribution.

Examples 2b to 6b, and Examples R1b and R2b

As shown in Table 2, a block copolymer 1 represented by Formula Y described above was obtained in the same manner as in Example 1b, except that each RAFT polymerization reaction solution (A) obtained in Examples 2a to 6a, and Examples R1a and R2a, containing the polymer-type RAFT agent, was used, and the reaction time and the like were changed to proceed the reaction sufficiently. The results of measuring the volume-average particle diameter (MV) and the like of the obtained block copolymer 1 are shown in Table 2.

TABLE 2

|  |  | Example | | | | | | | |
| --- | --- | --- | --- | --- | --- | --- | --- | --- | --- |
|  |  | R1b | 1b | 2b | 3b | 4b | 5b | 6b | R2b |
| Polymer-type RAFT agent | Type | R1a | 1a | 2a | 3a | 4a | 5a | 6a | R2a |
|  | Used amount (part by mass) | 5 | 5 | 5 | 5 | 5 | 5 | 5 | 5 |
| ST (part by mass) |  | 32.5 | 32.5 | 32.5 | 32.5 | 32.5 | 32.5 | 32.5 | 32.5 |
| AN (part by mass) |  | 12.5 | 12.5 | 12.5 | 12.5 | 12.5 | 12.5 | 12.5 | 12.5 |
| V-501 (part by mass) |  | 0.1 | 0.1 | 0.1 | 0.1 | 0.1 | 0.1 | 0.1 | 0.1 |
| MV (nm) |  | 10 | 20 | 50 | 70 | 100 | 180 | 300 | 800 |
| pH at end of reaction |  | 10 | 11 | 11 | 11 | 11 | 12 | 12 | 13 |
| Mn |  | 57000 | 58000 | 58000 | 58000 | 58000 | 58000 | 57000 | 56000 |
| Mw/Mn |  | 1.9 | 1.5 | 1.5 | 1.5 | 1.5 | 1.6 | 1.8 | 2.5 |
| Reaction time (min) |  | 240 | 90 | 90 | 90 | 90 | 120 | 240 | 480 |

In Example R1b, the molecular weight distribution was broad, and in Example R2b, the reaction time was long and the molecular weight distribution was broad. From the viewpoint of increasing productivity, it was preferable to react the components with a shorter reaction time to narrow the molecular weight distribution.

Examples 2c to 6c, and Examples R1c and R2c

As shown in Table 3, a block copolymer 2 represented by Formula Z described above was obtained in the same manner as in Example 1b, except that each RAFT polymerization reaction solution (B) obtained in Examples 2b to 6b, and Examples R1b and R2b, containing the block copolymer 1, was used, and the reaction time and the like were changed to proceed the reaction sufficiently. The results of measuring the volume-average particle diameter (MV) and the like of the obtained block copolymer 2 are shown in Table 3.

In Example R1c, the molecular weight distribution was broad, and in Example R2c, the reaction time was long, the amount of coagulated matter was large, and the molecular weight distribution was broad. From the viewpoint of increasing productivity, it was preferable to react the components with a shorter reaction time to reduce the amount of coagulated matter and narrow the molecular weight distribution.

Experimental System Focusing on Base Amount

Examples 7a to 9a, and Examples R3a and R4a

As shown in Table 4, a RAFT polymerization reaction solution (A) containing the polymer-type RAFT agent represented by Formula X described above was obtained in the same manner as in Example 1a, except that the molar ratio of base/acid group was changed to saponify the carboxy group of BM1430 and maintain the state. The results of measuring the molecular weight distribution and the like of the obtained polymer-type RAFT agent are shown in Table 4.

TABLE 3

|  | Example | | | | | | | |
| --- | --- | --- | --- | --- | --- | --- | --- | --- |
|  | R1c | 1c | 2c | 3c | 4c | 5c | 6c | R2c |
| Type of block copolymer 1 | R1b | 1b | 2b | 3b | 4b | 5b | 6b | R2b |
| BA (part by mass) | 50 | 50 | 50 | 50 | 50 | 50 | 50 | 50 |
| MV (nm) | 20 | 30 | 80 | 90 | 140 | 230 | 450 | 850 |
| pH at end of reaction | 8 | 8 | 8 | 8 | 8 | 8 | 9 | 9 |
| Mn | 100000 | 116000 | 116000 | 116000 | 116000 | 113000 | 110000 | 100000 |
| Mw/Mn | 2.3 | 1.8 | 1.8 | 1.8 | 1.8 | 1.9 | 1.9 | 2.3 |
| Reaction time (min) | 90 | 90 | 90 | 90 | 90 | 150 | 360 | 600 |
| Amount of coagulated matter (part by mass) | 0.3 | 0.1 | 0.1 | 0.1 | 0.1 | 0.2 | 0.5 | 5 |

TABLE 4

| | Example | | | | |
|---|---|---|---|---|---|
| | R3a | 7a | 8a | 9a | R4a |
| ST (part by mass) | 100 | 100 | 100 | 100 | 100 |
| V-501 (part by mass) | 5 | 5 | 5 | 5 | 5 |
| BM1430 (part by mass) | 6 | 6 | 6 | 6 | 6 |
| M3/(M1 + M2) (molar ratio) | 0.7 | 1.0 | 1.7 | 6.8 | 13.5 |
| TSC at end of reaction (% by mass) | 3.90 | 4.30 | 4.55 | 5.15 | 5.90 |
| MV (nm) | 100 | 50 | 40 | 30 | 30 |
| pH at end of reaction | 6 | 9 | 10 | 13 | 14 |
| Mn | 6300 | 6100 | 6000 | 5800 | 5800 |
| Mw/Mn | 2.6 | 1.9 | 1.5 | 1.1 | 1.1 |
| Reaction time (min) | 1200 | 660 | 480 | 480 | 600 |
| Amount of coagulated matter (part by mass) | 10 | 2 | 0.8 | 0.1 | 0.1 |

Example R3a and Example R4a are comparative examples with respect to the first aspect because the range of the molar ratio of {M3/(M1+M2)} in [1-1] of the first aspect was not satisfied.

In Example R3a, the molar ratio of base/acid group was small, the yield was low, the amount of coagulated matter was large, and the molecular weight distribution was broad. From the viewpoint of increasing productivity and quality of the polymer, it was preferable to react the components with a shorter reaction time to reduce the amount of coagulated matter and narrow the molecular weight distribution. In Example R4b, the molar ratio of base/acid group was large, the pH of the reaction solution was high, and in the subsequent step (hypertrophy treatment, coagulation treatment, or the like), a decomposition reaction of the monomer may occur, and the reaction yield may decrease. Therefore, from the viewpoint of increasing the productivity, it was not preferable that the pH is too high.

Examples 7b to 9b, and Examples R3b and R4b

As shown in Table 5, a block copolymer 1 represented by Formula Y described above was obtained in the same manner as in Example 1b, except that each RAFT polymerization reaction solution (A) obtained in Examples 7a to 9a, and Examples R3a and R4a, containing the polymer-type RAFT agent, was used, and the reaction time and the like were changed to proceed the reaction sufficiently.

The results of measuring the molecular weight distribution and the like of the obtained block copolymer 1 are shown in Table 5.

TABLE 5

| | | Example | | | | |
|---|---|---|---|---|---|---|
| | | R3b | 7b | 8b | 9b | R4b |
| Polymer-type RAFT agent | Type | R3a | 7a | 8a | 9a | R4a |
| | Used amount (part by mass) | 5 | 5 | 5 | 5 | 5 |
| ST (part by mass) | | 32.5 | 32.5 | 32.5 | 32.5 | 32.5 |
| AN (part by mass) | | 12.5 | 12.5 | 12.5 | 12.5 | 12.5 |
| V-501 (part by mass) | | 0.1 | 0.1 | 0.1 | 0.1 | 0.1 |
| MV (nm) | | 200 | 100 | 80 | 200 | 300 |
| pH at end of reaction | | 6 | 8 | 9 | 12 | 13 |
| Mn | | 50000 | 55000 | 58000 | 56000 | 56000 |
| Mw/Mn | | 3.3 | 2.1 | 1.7 | 1.7 | 2.2 |
| Reaction time (min) | | 120 | 90 | 90 | 120 | 180 |

In Example R3b, the molecular weight distribution was broad. In Example R4b, the molecular weight distribution was broad. From the viewpoint of increasing quality of the polymer, it was preferable to narrow the molecular weight distribution.

Examples 7c to 9c, and Examples R3c and R4c

As shown in Table 6, a block copolymer 2 represented by Formula Z described above was obtained in the same manner as in Example 1b, except that each RAFT polymerization reaction solution (B) obtained in Examples 7b to 9b, and Examples R3b and R4b, containing the block copolymer 1, was used, and the reaction time and the like were changed to proceed the reaction sufficiently.

The results of measuring the molecular weight distribution and the like of the obtained block copolymer 2 are shown in Table 6.

TABLE 6

| | Example | | | | |
|---|---|---|---|---|---|
| | R3c | 7c | 8c | 9c | R4c |
| Type of block copolymer 1 | R3b | 7b | 8b | 9b | R4b |
| BA (part by mass) | 50 | 50 | 50 | 50 | 50 |
| MV (nm) | 250 | 150 | 140 | 250 | 450 |
| pH at end of reaction | 6 | 8 | 8 | 9 | 10 |
| Mn | 60000 | 85000 | 110000 | 110000 | 100000 |
| Mw/Mn | 5.6 | 2.5 | 1.9 | 2.1 | 3.3 |
| Reaction time (min) | 150 | 90 | 90 | 150 | 240 |
| Amount of coagulated matter (part by mass) | 4 | 1 | 0.5 | 0.1 | 0.3 |

In Example R3c, the amount of coagulated matter was large, and the molecular weight distribution was broad. From the viewpoint of increasing productivity and quality of the polymer, it was preferable to reduce the amount of coagulated matter and narrow the molecular weight distribution. In Example R4c, the molecular weight distribution was broad. From the viewpoint of increasing quality of the polymer, it was preferable to narrow the molecular weight distribution.

Experimental System Focusing on RAFT Agent Amount

Examples 10a to 13a, and Examples R5a and R6a

As shown in Table 7, a RAFT polymerization reaction solution (A) containing the polymer-type RAFT agent represented by Formula X described above was obtained in the same manner as in Example 1a, except that the amounts of V-501 and BM1430 were changed, and the amount of potassium hydroxide was adjusted such that the molar ratio of base/acid group was constant.

The results of measuring the molecular weight distribution and the like of the obtained polymer-type RAFT agent are shown in Table 7.

TABLE 7

| | Example | | | | | |
|---|---|---|---|---|---|---|
| | R5a | 10a | 11a | 12a | 13a | R6a |
| ST (part by mass) | 100 | 100 | 100 | 100 | 100 | 100 |
| V-501 (part by mass) | 50 | 25 | 10 | 3 | 2 | 1 |
| BM1430 (part by mass) | 60 | 30 | 12 | 4 | 2 | 1 |
| M3/(M1 + M2) (molar ratio) | 3.4 | 3.4 | 3.4 | 3.3 | 3.6 | 3.6 |
| TSC at end of reaction (% by mass) | 10.10 | 7.70 | 5.50 | 4.50 | 4.30 | 4.10 |
| MV (nm) | 5 | 10 | 20 | 40 | 50 | 60 |
| pH at end of reaction | 13 | 13 | 13 | 11 | 11 | 11 |
| Mn | 600 | 1000 | 3000 | 9000 | 20000 | 35000 |
| Mw/Mn | 1.2 | 1.2 | 1.1 | 1.2 | 1.8 | 2.3 |
| Reaction time (min) | 180 | 240 | 280 | 360 | 360 | 360 |
| Amount of coagulated matter (part by mass) | 0.1 | 0.1 | 0.1 | 0.2 | 0.5 | 1.1 |

In Example R5a, the volume-average particle diameter (MV) was small, and from the viewpoint of increasing productivity, it was preferable that the volume-average particle diameter (MV) was a certain value or more. In Example R6a, the amount of coagulated matter was large, and the molecular weight distribution was broad. From the viewpoint of increasing productivity and quality of the polymer, it was preferable to reduce the amount of coagulated matter and narrow the molecular weight distribution.

Examples 10b to 13b, and Examples R5b and R6b

As shown in Table 8, a block copolymer 1 represented by Formula Y described above was obtained in the same manner as in Example 1b, except that each RAFT polymerization reaction solution (A) obtained in Examples 10a to 13a, and Examples R5a and R6a, containing the polymer-type RAFT agent, was used, and the amount of RAFT agent used was changed to equalize the number of molecules of the polymer-type RAFT agent contained in each reaction solution of Examples, and the reaction time and the like were changed to proceed the reaction sufficiently.

The results of measuring the molecular weight distribution and the like of the obtained block copolymer 1 are shown in Table 8.

In Example R5b, the reaction time was long and the molecular weight distribution was broad. From the viewpoint of increasing productivity, it was preferable to react the components with a shorter reaction time to narrow the molecular weight distribution. In Example R6b, the molecular weight distribution was broad. From the viewpoint of increasing quality of the polymer, it was preferable to narrow the molecular weight distribution.

Examples 10c to 13c, and Examples R5c and R6c

As shown in Table 9, a block copolymer 2 represented by Formula Z described above was obtained in the same manner as in Example 1c, except that each RAFT polymerization reaction solution (B) obtained in Examples 10b to 13b, and Examples R5b and R6b, containing the block copolymer 1, was used, and the reaction time and the like were changed to proceed the reaction sufficiently.

The results of measuring the molecular weight distribution and the like of the obtained block copolymer 2 are shown in Table 9.

TABLE 8

| | | Example | | | | | |
|---|---|---|---|---|---|---|---|
| | | R5b | 10b | 11b | 12b | 13b | R6b |
| Polymer-type RAFT agent | Type | R5a | 10a | 11a | 12a | 13a | R6a |
| | Used amount (part by mass) | 0.5 | 1 | 2.5 | 8 | 15 | 30 |
| ST (part by mass) | | 37 | 36.5 | 35 | 29.5 | 22.5 | 7.5 |
| AN (part by mass) | | 12.5 | 12.5 | 12.5 | 12.5 | 12.5 | 12.5 |
| V-501 (part by mass) | | 0.1 | 0.1 | 0.1 | 0.1 | 0.1 | 0.1 |
| MV (nm) | | 300 | 200 | 80 | 70 | 70 | 60 |
| pH at end of reaction | | 13 | 13 | 12 | 10 | 9 | 9 |
| Mn | | 50000 | 55000 | 58000 | 55000 | 58000 | 58000 |
| Mw/Mn | | 2.5 | 1.7 | 1.5 | 1.7 | 2.1 | 2.7 |
| Reaction time (min) | | 400 | 240 | 90 | 90 | 90 | 90 |

TABLE 9

|  | Example | | | | | |
| --- | --- | --- | --- | --- | --- | --- |
|  | R5c | 10c | 11c | 12c | 13c | R6c |
| Type of block copolymer 1 | R5b | 10b | 11b | 12b | 13b | R6b |
| BA (part by mass) | 50 | 50 | 50 | 50 | 50 | 50 |
| MV (nm) | 450 | 250 | 130 | 110 | 110 | 100 |
| pH at end of reaction | 10 | 10 | 9 | 8 | 7 | 7 |
| Mn | 100000 | 100000 | 116000 | 110000 | 117000 | 116000 |
| Mw/Mn | 2.7 | 1.9 | 1.8 | 1.8 | 2.1 | 2.8 |
| Reaction time (min) | 240 | 150 | 90 | 90 | 90 | 90 |
| Amount of coagulated matter (part by mass) | 5 | 0.3 | 0.1 | 0.2 | 0.2 | 3 |

In Example R5c, the reaction time was long, the amount of coagulated matter was large, and the molecular weight distribution was broad. From the viewpoint of increasing productivity and quality of the polymer, it was preferable to react the components with a shorter reaction time to reduce the amount of coagulated matter and narrow the molecular weight distribution.

In Example R6c, the amount of coagulated matter was large, and the molecular weight distribution was broad. From the viewpoint of increasing productivity and quality of the polymer, it was preferable to reduce the amount of coagulated matter and narrow the molecular weight distribution.

Experimental System Focusing on Type of Monomer Forming Polymer-Type RAFT Agent

Examples 14a to 19a

As shown in Table 10, a RAFT polymerization reaction solution (A) containing the polymer-type RAFT agent represented by Formula X described above was obtained in the same manner as in Example 1a, except that the type of the monomer to be polymerized was changed and the type of the corresponding RAFT agent was combined. Here, the PS chain block of Formula X was substituted with a polymer chain of the monomer used in each of Examples. The results of measuring the number-average molecular weight and the like of the obtained polymer-type RAFT agent are shown in Table 10.

TABLE 10

|  | Example | | | | | |
| --- | --- | --- | --- | --- | --- | --- |
|  | 14a | 15a | 16a | 17a | 18a | 19a |
| ST (part by mass) | — | — | — | 100 | — | — |
| AN (part by mass) | 100 | — | — | — | — | — |
| BA (part by mass) | — | 100 | — | — | 100 | — |
| MMA (part by mass) | — | — | 100 | — | — | 100 |
| V-501 (part by mass) | 5 | 5 | 5 | 5 | 5 | 5 |
| BM1430 (part by mass) | 6 | 6 | 6 | — | — | — |
| BM1432 (part by mass) | — | — | — | 6 | 6 | 6 |
| M3/(M1 + M2) (molar ratio) | 3.4 | 3.4 | 3.4 | 3.4 | 3.4 | 3.4 |
| TSC at end of reaction (% by mass) | 4.70 | 4.80 | 4.60 | 4.80 | 4.80 | 4.80 |
| MV (nm) | 30 | 30 | 30 | 30 | 30 | 30 |
| pH at end of reaction | 11 | 8 | 8 | 12 | 8 | 8 |
| Mn | 5500 | 5500 | 5500 | 5800 | 5500 | 5800 |
| Mw/Mn | 2.3 | 1.9 | 2.2 | 1.5 | 2.2 | 1.9 |
| Reaction time (min) | 240 | 240 | 420 | 360 | 180 | 300 |
| Amount of coagulated matter (part by mass) | 0.3 | 0.3 | 0.3 | 0.1 | 0.3 | 0.3 |

The effect of the RAFT agent may vary depending on the type of the monomer to be polymerized. In Example 17a, the molecular weight distribution was broader as compared with Example 3a. From the viewpoint of increasing productivity, it was preferable to use BM1430 with respect to the styrene monomer. In Example 16a, the molecular weight distribution was broader and the reaction time was longer as compared with Example 19a. From the viewpoint of increasing productivity and the quality of the polymer, it was preferable to use BM1432 with respect to methyl methacrylate.

Examples 14B to 19b

As shown in Table 11, a block copolymer 1 represented by Formula Y described above was obtained in the same manner as in Example 1b, except that each RAFT polymerization reaction solution (A) obtained in Examples 14a to 19a, containing the polymer-type RAFT agent, was used, and the blending amount of the monomer was changed. Here, the PS chain block of Formula Y was substituted with a polymer chain derived from the polymer-type RAFT agent of each of Examples.

The results of measuring the number-average molecular weight and the like of the obtained block copolymer 1 are shown in Table 11.

TABLE 11

|  |  | \multicolumn{6}{c}{Example} |
| --- | --- | --- | --- | --- | --- | --- | --- |
|  |  | 14b | 15b | 16b | 17b | 18b | 19b |
| Polymer-type RAFT agent | Type | 14a | 15a | 16a | 17a | 18a | 19a |
|  | Used amount (part by mass) | 5 | 5 | 5 | 5 | 5 | 5 |
| ST (part by mass) |  | 37.5 | 37.5 | 37.5 | 32.5 | 37.5 | 32.5 |
| AN (part by mass) |  | 7.5 | 12.5 | 12.5 | 12.5 | 12.5 | 12.5 |
| V-501 (part by mass) |  | 0.1 | 0.1 | 0.1 | 0.1 | 0.1 | 0.1 |
| MV (nm) |  | 70 | 70 | 70 | 70 | 70 | 70 |
| pH at end of reaction |  | 11 | 8 | 8 | 11 | 8 | 8 |
| Mn |  | 50000 | 51000 | 52000 | 58000 | 51000 | 51000 |
| Mw/Mn |  | 2.3 | 2.1 | 2.3 | 1.8 | 2.3 | 2.1 |
| Reaction time (min) |  | 90 | 90 | 90 | 90 | 90 | 90 |

Examples 14c to 19c

As shown in Table 12, a block copolymer 2 represented by Formula Z described above was obtained in the same manner as in Example 1c, except that each RAFT polymerization reaction solution (B) obtained in Examples 14b to 19b, containing the block copolymer 1, was used. Here, the PS chain block of Formula Z was substituted with a polymer chain derived from the polymer-type RAFT agent of each of Examples. The results of measuring the number-average molecular weight and the like of the obtained block copolymer 2 are shown in Table 12.

TABLE 12

|  | \multicolumn{6}{c}{Example} |
| --- | --- | --- | --- | --- | --- | --- |
|  | 14c | 15c | 16c | 17c | 18c | 19c |
| Type of block copolymer 1 | 14b | 15b | 16b | 17b | 18b | 19b |
| BA (part by mass) | 50 | 45 | 50 | 50 | 45 | 50 |
| MV (nm) | 90 | 90 | 90 | 90 | 90 | 90 |
| pH at end of reaction | 8 | 8 | 8 | 8 | 8 | 8 |
| Mn | 100000 | 100000 | 100000 | 116000 | 100000 | 100000 |
| Mw/Mn | 2.5 | 2.2 | 2.5 | 2.0 | 2.3 | 2.2 |
| Reaction time (min) | 90 | 90 | 90 | 90 | 90 | 90 |
| Amount of coagulated matter (part by mass) | 0.3 | 0.3 | 0.3 | 0.1 | 0.3 | 0.3 |

Experimental System Focusing on Amount of Polymer-Type RAFT Agent Used

Examples 20B to 22b

As shown in Table 13, a block copolymer 1 represented by Formula Y described above was obtained in the same manner as in Example 1b, except that each RAFT polymerization reaction solution (A) obtained in Example 3a, containing the polymer-type RAFT agent, was used, and the use amount thereof was changed.

The results of measuring the number-average molecular weight and the like of the obtained block copolymer 1 are shown in Table 13.

TABLE 13

|  |  | \multicolumn{3}{c}{Example} |
| --- | --- | --- | --- | --- |
|  |  | 20b | 21b | 22b |
| Polymer-type RAFT agent | Type | 3a | 3a | 3a |
|  | Used amount (part by mass) | 1 | 10 | 20 |
| ST (part by mass) |  | 36.5 | 27.5 | 17.5 |
| AN (part by mass) |  | 12.5 | 12.5 | 12.5 |
| V-501 (part by mass) |  | 0.02 | 0.2 | 0.4 |
| MV (nm) |  | 200 | 50 | 40 |

TABLE 13-continued

|  | \multicolumn{3}{c}{Example} |
| --- | --- | --- | --- |
|  | 20b | 21b | 22b |
| pH at end of reaction | 11 | 11 | 11 |
| Mn | 290000 | 29000 | 14000 |
| Mw/Mn | 1.5 | 1.5 | 1.5 |
| Reaction time (min) | 120 | 90 | 90 |

From the results in Table 13, it was possible to obtain a diblock copolymer having various molecular weights with a narrow molecular weight distribution.

Examples 20c to 22c

As shown in Table 14, a block copolymer 2 represented by Formula Z described above was obtained in the same manner as in Example 1c, except that each RAFT polymerization reaction solution (B) obtained in Examples 20b to 22b, containing the block copolymer 1, was used.

The results of measuring the number-average molecular weight and the like of the obtained block copolymer 2 are shown in Table 14.

TABLE 14

| | Example | | |
|---|---|---|---|
| | 20c | 21c | 22c |
| Type of block copolymer 1 | 20b | 21b | 22b |
| BA (part by mass) | 50 | 50 | 50 |
| MV (nm) | 300 | 80 | 70 |
| pH at end of reaction | 8 | 8 | 8 |
| Mn | 580000 | 58000 | 29000 |
| Mw/Mn | 1.9 | 1.8 | 1.8 |
| Reaction time (min) | 90 | 90 | 90 |
| Amount of coagulated matter (part by mass) | 0.5 | 0.1 | 0.1 |

From the results in Table 14, it was possible to obtain a triblock copolymer having various molecular weights with a narrow molecular weight distribution.

Experimental System Focusing on Type of Monomer Forming Copolymer 1

Examples 23B to 29b

As shown in Table 15, a block copolymer 1 represented by Formula Y described above was obtained in the same manner as in Example 1b, except that the RAFT polymerization reaction solution (A) obtained in Example 3a, containing the polymer-type RAFT agent, was used, and the type, compositional ratio, and the like of the monomer to be polymerized in the reaction solution were changed. Here, the AS chain block of Formula Y was substituted with a (co)polymer chain of the monomer used in each of Examples.

The results of measuring the number-average molecular weight and the like of the obtained block copolymer 1 are shown in Table 15.

TABLE 15

| | | Example | | | | | | |
|---|---|---|---|---|---|---|---|---|
| | | 23b | 24b | 25b | 26b | 27b | 28b | 29b |
| Polymer-type RAFT agent | Type | 3a | 3a | 3a | 3a | 3a | 3a | 3a |
| | Used amount (part by mass) | 5 | 5 | 5 | 5 | 5 | 5 | 5 |
| ST (part by mass) | | 50 | — | — | — | 32.5 | 32.5 | 32.5 |
| AN (part by mass) | | — | 50 | — | — | 12.5 | 12.5 | 12.5 |
| MMA (part by mass) | | — | — | 50 | — | — | — | — |
| BA (part by mass) | | — | — | — | 50 | — | — | — |
| V-501 (part by mass) | | 0.1 | 0.1 | 0.1 | 0.1 | 0.1 | 0.1 | 0.1 |
| MV (nm) | | 70 | 70 | 70 | 70 | 70 | 70 | 70 |
| pH at end of reaction | | 11 | 11 | 8 | 8 | 11 | 11 | 11 |
| Mn | | 62000 | 61000 | 61000 | 61000 | 58000 | 58000 | 58000 |
| Mw/Mn | | 1.5 | 1.7 | 1.9 | 1.9 | 1.5 | 1.5 | 1.5 |
| Reaction time (min) | | 90 | 90 | 90 | 90 | 90 | 90 | 90 |

From the results in Table 15, it was possible to polymerize various monomers in the same manner with respect to the polymer-type RAFT agent, and it was possible to obtain a diblock copolymer broadly used.

Examples 23c to 29c

As shown in Table 16, a block copolymer 2 represented by Formula Z described above was obtained in the same manner as in Example 1c, except that each RAFT polymerization reaction solution (B) obtained in Examples 23b to 29b, containing the block copolymer 1, was used, and the type, compositional ratio, and the like of the monomer to be polymerized in the solution were changed. Here, the PBA chain block of Formula Z was substituted with a (co)polymer chain of the monomer used in each of Examples. The results of measuring the number-average molecular weight and the like of the obtained block copolymer 2 are shown in Table 16.

TABLE 16

| | Example | | | | | | |
|---|---|---|---|---|---|---|---|
| | 23c | 24c | 25c | 26c | 27c | 28c | 29c |
| Type of block copolymer 1 | 23b | 24b | 25b | 26b | 27b | 28b | 29b |
| ST (part by mass) | 32.5 | 32.5 | 32.5 | 32.5 | 50 | — | — |

TABLE 16-continued

| | Example | | | | | | |
|---|---|---|---|---|---|---|---|
| | 23c | 24c | 25c | 26c | 27c | 28c | 29c |
| AN (part by mass) | 12.5 | 12.5 | 12.5 | 12.5 | — | 50 | — |
| MMA (part by mass) | — | — | — | — | — | — | 50 |
| MV (nm) | 90 | 90 | 90 | 90 | 90 | 90 | 90 |
| pH at end of reaction | 11 | 11 | 8 | 8 | 11 | 11 | 8 |
| Mn | 116000 | 114000 | 110000 | 110000 | 116000 | 116000 | 116000 |
| Mw/Mn | 1.8 | 1.9 | 2.1 | 2.1 | 1.8 | 1.8 | 1.8 |
| Reaction time (min) | 90 | 90 | 90 | 90 | 90 | 90 | 90 |
| Amount of coagulated matter (part by mass) | 0.1 | 0.1 | 0.1 | 0.1 | 0.1 | 0.1 | 0.1 |

From the results in Table 16, it was possible to polymerize various monomers in the same manner with respect to the block copolymer 1, and it was possible to obtain a triblock copolymer broadly used.

INDUSTRIAL APPLICABILITY

The RAFT polymerization reaction solution suitable for RAFT polymerization is suitable for the production of a polymer having a narrow molecular weight distribution or the production of a block copolymer. The obtained polymer can be used as an aqueous dispersion, for example, as a pressure-sensitive adhesive, an adhesive, a coating agent, or the like. The resin composition recovered by coagulation or the like can be used for, for example, a molded body, a film, a sheet, and the like.

What is claimed is:

1. A RAFT polymerization reaction solution comprising:
a polymer-type RAFT agent represented by Formula (2);
water; and
a water-soluble inorganic base,
wherein at least a part of an acid group included in the polymer-type RAFT agent forms a salt with a cation component of the water-soluble inorganic base,
wherein a pH of the RAFT polymerization reaction solution is 8 to 13,

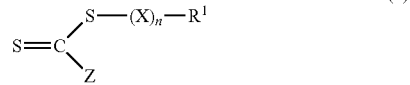

(2)

in Formula (2), $R^1$ represents an organic group, the organic group has one or more acid groups selected from $-CO_2H$, $-SO_3H$, and $-PO_4H$, Z represents an organic group selected from an alkyl group, an aryl group, an arylalkyl group, an alkylthio group, an arylthio group, and an arylalkylthio group, a part of the organic group represented by Z may be substituted, X represents a repeating unit of any ethylenically unsaturated monomer, n represents an integer of 1 to 1,000, and in a case where n is 2 or more, a plurality of X's may be the same or different from each other,
wherein X to which R1 is bonded is a methacrylic acid ester,
$R^1$ is an organic group having a carbon atom bonded to X, the carbon atom of the organic group is quaternary, and the carbon atom is bonded to a cyano group.

2. A RAFT polymerization reaction solution comprising:
a RAFT agent represented by Formula (1);
water; and
a water-soluble inorganic base,
wherein the RAFT polymerization reaction solution may further contain a polymerization initiator as an optional component,
a molar ratio represented by M3/(M1+M2) is 1.0 to 10, in which a number of moles of an acid group included in the RAFT agent is indicated as M1, a number of moles of an acid group which may be included in the polymerization initiator is indicated as M2, and a number of moles of the water-soluble inorganic base is indicated as M3, and
at least a part of the acid group included in the RAFT agent and at least a part of the acid group which may be included in the polymerization initiator form a salt with a cation component of the water-soluble inorganic base,

(1)

in Formula (1), $R^1$ represents an organic group, the organic group has one or more acid groups selected from $-CO_2H$, $-SO_3H$, and $-PO_4H$, Z represents an organic group selected from an alkyl group, an aryl group, an arylalkyl group, an alkylthio group, an arylthio group, and an arylalkylthio group, and a part of the organic group represented by Z may be substituted,
wherein an amount of the RAFT agent is 0.001 to 0.50% by mass with respect to a total mass of the RAFT polymerization reaction solution.

3. The RAFT polymerization reaction solution according to claim 2,
wherein an amount of the water is 80% by mass or more with respect to a total mass of the RAFT polymerization reaction solution.

4. The RAFT polymerization reaction solution according to claim 2,
wherein an amount of the water is 90% by mass or more with respect to a total mass of the RAFT polymerization reaction solution.

5. The RAFT polymerization reaction solution according to claim 2,
wherein Z in Formula (1) is an alkylthio group which may be substituted.

6. The RAFT polymerization reaction solution according to claim 2,
wherein the polymerization initiator is a water-soluble polymerization initiator.

* * * * *